US011305416B1

(12) United States Patent
Correnti et al.

(10) Patent No.: US 11,305,416 B1
(45) Date of Patent: Apr. 19, 2022

(54) DYNAMIC ARRANGEMENT OF MOTORIZED FURNITURE

(71) Applicant: Alarm.com Incorporated, Tysons, VA (US)

(72) Inventors: Matthew Daniel Correnti, Newtown Square, PA (US); Kara Edman, Arlington, VA (US); Isaac Murakami, Tysons, VA (US)

(73) Assignee: Alarm.com Incorporated, Tysons, VA (US)

(*) Notice: Subject to any disclaimer, the term of this patent is extended or adjusted under 35 U.S.C. 154(b) by 128 days.

(21) Appl. No.: 16/871,954

(22) Filed: May 11, 2020

Related U.S. Application Data

(60) Provisional application No. 62/845,649, filed on May 9, 2019.

(51) Int. Cl.
*B25J 5/00* (2006.01)
*G05B 19/042* (2006.01)
*B25J 9/00* (2006.01)
*E04B 1/343* (2006.01)
*B25J 9/16* (2006.01)

(52) U.S. Cl.
CPC ............. *B25J 5/007* (2013.01); *B25J 9/0003* (2013.01); *B25J 9/1694* (2013.01); *E04B 1/343* (2013.01); *G05B 19/042* (2013.01); *G05B 2219/2642* (2013.01)

(58) Field of Classification Search
CPC .......... G05B 19/042; G05B 2219/2642; B25J 5/007; B25J 9/0003; B25J 9/1694; E04B 1/343
See application file for complete search history.

(56) References Cited

U.S. PATENT DOCUMENTS

| | | | |
|---|---|---|---|
| 6,257,085 B1* | 7/2001 | Bokamper | H02K 7/081 188/83 |
| 10,022,873 B2* | 7/2018 | Larrea-Tamayo | G06F 3/04847 |
| 10,378,200 B2* | 8/2019 | Larrea-tamayo | E04B 1/343 |
| 10,502,295 B2* | 12/2019 | Kollreider | F16H 13/06 |
| 2010/0327717 A1* | 12/2010 | Huber | E05F 15/63 312/319.5 |
| 2011/0062842 A1* | 3/2011 | Huber | E05F 15/50 312/319.5 |

* cited by examiner

*Primary Examiner* — Crystal J Barnes-Bullock
(74) *Attorney, Agent, or Firm* — Fish & Richardson P.C.

(57) ABSTRACT

Methods, systems, and apparatus, including computer programs encoded on a computer storage medium, for validation of mobile device workflows. In some implementations, sensor data is received from a sensor located at a property. Based on the sensor data, an event that is occurring at the property is determined. Based on the event that is occurring at the property, a configuration for furniture located at the property is determined. Instructions are provided to the furniture to move into the configuration.

20 Claims, 8 Drawing Sheets

DYNAMIC ARRANGEMENT OF MOTORIZED FURNITURE

CROSS-REFERENCE TO RELATED APPLICATION

This application claims priority from U.S. Application No. 62/845,649, filed May 9, 2019, which is incorporated by reference.

TECHNICAL FIELD

This specification relates generally to motorized furniture and computer systems that can monitor environments.

BACKGROUND

Adjustable, motorized furniture allows an owner or a resident to configure the furniture in various arrangements and reconfigure the furniture on demand.

SUMMARY

In some implementations, a system integrates motorized furniture into a smart property ecosystem. The system may collect data from various sensors that are part of the smart property ecosystem. The system may interpret the sensor data to determine various, likely scenarios, determine an optimal configuration of one or more pieces of the motorized furniture based on the determined scenario, and dynamically adjust a configuration of the one or more pieces of the motorized furniture.

In some implementations, the system interprets the sensor data to determine a likely climate control scenario. In these implementations, the furniture may be reconfigured into an energy efficient configuration.

In some implementations, the system interprets the sensor data to determine a likely maintenance and/or work order scenario. In these implementations, the furniture may be reconfigured into a work-order friendly arrangement prior to maintenance and/or work being performed.

In some implementations, the system interprets the sensor data to determine a likely emergency scenario. In these implementations, the furniture may be reconfigured so as to clear a path between a property's occupants and its exits, to position furniture in front of windows, and/or to consolidate furniture in order, for example, to slow the spread of fire.

In some implementations, the system interprets the sensor data to determine a likely extreme weather scenario. In these implementations, the furniture may be reconfigured into an arrangement that protects the property's occupants.

In some implementations, the system interprets the sensor data to determine a likely asset protection scenario. In these implementations, the furniture may be reconfigured so as to hide an asset, to move an asset, or otherwise protect an asset.

In some implementations, the system interprets the sensor data to determine a likely intrusion scenario. In these implementations, the furniture may be reconfigured so as to prevent access to the property through an entrance or possible entrance, such as a door or window.

In some implementations, the system interprets the sensor data to determine a likely high occupancy scenario. In these implementations, the furniture may be reconfigured so as to maximize the space available, and/or to hide or otherwise protect fragile assets.

In some implementations, the system interprets the sensor data to determine a wellness scenario. In these implementations, the furniture may be reconfigured so as to bring furniture or assets located on furniture (e.g., a phone) closer to an occupant of the property experiencing health issues.

In one general aspect, a method includes: receiving, from a sensor located at a property, sensor data; based on the sensor data, determining an event that is occurring at the property; based on the event that is occurring at the property, determining a configuration for furniture located at the property; and providing, to the furniture, instructions to move into the configuration.

In some implementations, determining the configuration for the furniture located at the property includes determining a position for the furniture such that at least one of the following is provided: the furniture is to be moved to a position that provides one or more persons in the property a clear path to one or more exits of the property; the furniture is to be moved adjacent to one or more walls of the property; the furniture is to be moved away from a door of the property; or the furniture is to be moved away from a window of the property.

In some implementations, determining the event that is occurring at the property includes determining that an emergency is occurring at the property.

In some implementations, determining the configuration for the furniture located at the property includes determining a position for the furniture such that at least one of the following is provided: the furniture is to be moved in front of a window of the property; or the furniture is to be moved in front of a door of the property.

In some implementations, determining the event that is occurring at the property includes: determining that a break-in is occurring at the property; or determining that an area in which the property is located is experiencing severe weather.

In some implementations, determining the configuration for the furniture located at the property includes determining a position for the furniture such that at least one of the following is provided: the furniture is to be moved away from one or more animals in the property; the furniture is to be moved away from a pool outside the property; the furniture is to be moved away from an open or broken window of the property; the furniture is to be moved away from an open door of the property; the furniture is to be moved away from a fire in the property; the furniture is to be moved away from a heating element of the property; the furniture is to be moved away from a cooling element of the property; the furniture is to be moved away from direct sunlight; the furniture is to be moved away from moisture; or the furniture is to be moved to place at least a portion of the furniture on which an asset rests away from one or more of direct sunlight, moisture, fire, smoke, or a heating element of the property.

In some implementations, determining the event that is occurring at the property includes: determining that the furniture is being damaged; determining that a likelihood of the furniture being damaged meets a threshold likelihood; determining that an asset placed on the furniture is being damaged; or determining that a likelihood of an asset placed on the furniture being damaged meets a threshold likelihood.

In some implementations, determining the configuration for the furniture located at the property includes determining a position for the furniture such that at least one of the following is provided: the furniture is to be moved to a position away from a heating element of the property; the furniture is to be moved to a position away from a cooling element of the property; the furniture is to be moved to a position in front of a window of the property that is allowing sunlight to enter the property; the furniture is to be moved to a position away from a window of the property to allow additional sunlight to enter the property; the furniture is to be moved to a position in front of a window of the property that is open or broken; or the furniture is to be moved to a position away from a window of the property that is open or broken.

In some implementations, determining the event that is occurring at the property includes: determining that a temperature of the property meets a threshold temperature; determining that a rate of temperature increase meets a threshold rate; determining that a rate of temperature decrease meets a threshold rate; determining that a heating unit of the property has been turned on; determining that a cooling unit of the property has been turned on; determining that a heating unit of the property has been turned off; or determining that a cooling unit of the property has been turned off.

In some implementations, determining the configuration for the furniture located at the property includes determining a position for the furniture such that at least one of the following is provided: the furniture is to be moved to a position adjacent to a person in the property; or the furniture is to be moved to a position closer to a pool of the property.

In some implementations, determining the event that is occurring at the property includes determining that one or more persons at the property require assistance.

In some implementations, determining the configuration for the furniture located at the property includes determining a position for the furniture such that at least one of the following is provided: the furniture is to be moved to a position away from one or more persons in the property; or the furniture is to be moved adjacent to one or more walls of the property.

In some implementations, determining the event that is occurring at the property includes determining that an occupancy of the property exceeds a threshold occupancy.

In some implementations, determining the configuration for the furniture located at the property includes: determining a current position of the furniture; and determining a final position for the furniture.

In some implementations, determining the configuration for the furniture located at the property includes determining a path for the furniture to travel from the current position to the final position.

In some implementations, determining the event that is occurring at the property includes: determining that a break-in is occurring at the property; determining that an area in which the property is located is experiencing severe weather; or determining that a current time corresponds to a scheduled arrival time of a visitor at the property, and determining the configuration for the furniture located at the property includes: determining to close one or more motorized components of the furniture; or determining to lock one or more locking mechanisms of the furniture.

In some implementations, determining that event that is occurring at the property includes: determining an emergency is occurring at the property; determining an occupancy of the property has met a threshold occupancy; determining a current time is within a time period; determining the furniture or an asset placed on the furniture is in direct sunlight; or determining the furniture or an asset placed on the furniture is adjacent an open or broken window, and determining the configuration for the furniture located at the property includes determining to raise the furniture.

In some implementations, determining that event that is occurring at the property includes: determining an occupancy of the property has met a threshold occupancy; determining a current time is within a time period; determining one or more persons at the property need assistance; determining a break-in is occurring at the property; or determining an emergency is occurring at the property, and determining the configuration for the furniture located at the property includes determining to extend or compress the furniture.

In some implementations, receiving the sensor data includes receiving sensor data from at least one of a smoke detector, a carbon monoxide detector, a camera, a moisture sensor, a magnetic door sensor, a magnetic window sensor, a motion detector, a laser break beam sensor, an infrared light break beam sensor, a smart door lock, a smart window lock, a light sensor, a visible light camera, an infrared light camera, or a temperature sensor.

In some implementations, receiving the sensor data includes receiving sensor data indicating at least one of a presence of smoke in the property, a presence of carbon monoxide in the property, an interior temperature of the property, a presence of moisture in the property, a door of the property is open, a door of the property is unlocked, a door of the property is locked, a window of the property is open, a window of the property is unlocked, a window of the property is locked, presence of light in the property, absence of light in the property, one or more persons in the property, one or more persons outside the property, one or more persons in a pool outside the property, one or more children in the property, one or more children outside the property, one or more children in a pool outside the property, one or more animals in the property, one or more animals outside the property, or one or more animals in a pool outside the property.

In some implementations, determining an event that is occurring at the property includes determining at least one of that a fire has started in the property, dangerous levels of carbon monoxide are present in the property, a threshold interior temperature of the property is met, a threshold rate of change of the property's interior temperature is met, a door of the property has been opened, a door of the property has been forcibly opened, a window of the property has been opened, a window of the property has been broken, a window of the property has been forcibly opened, moisture is present in the property, flooding is occurring at the property, severe weather conditions in an area where the property is located, an asset in the property has been damaged, an asset in the property has a sufficiently high likelihood of being damaged, high-occupancy in the property, an approximate temperature of an asset meets a threshold temperature, an approximate rate of change in an asset's temperature meets a threshold rate of temperature change, a person in the property has fallen, a current time corresponds to a scheduled time of a maintenance or work order, an asset is in direct sunlight, a child is approaching stairs of the property, a child is approaching a pool outside the property, a child has fallen into a pool outside the property, an animal has fallen into a pool outside the property, an animal is damaging an asset in the property, an animal is attacking a person in the property, or an animal is attacking a person outside the property.

In some implementations, the method includes determining a current configuration of the furniture.

In some implementations, the method includes: comparing the current configuration with the configuration; and based on the comparison, determining a path for the furniture.

In some implementations, determining a current configuration of the furniture includes accessing a previous configuration last provided to the furniture.

In some implementations, determining a current configuration of the furniture includes receiving, from one or more sensors, located on the furniture, sensor data indicating at least one of a location of the furniture, a position of the furniture, or an orientation of the furniture.

In some implementations, determining a current configuration of the furniture includes receiving, from one or more sensors, not located on the furniture, sensor data indicating at least one of a location of the furniture, a position of the furniture, or an orientation of the furniture.

In some implementations, the sensor is one of a smoke detector, a motion detector, a moisture sensor, a thermostat, a thermometer, a visible-light camera, an infrared-light camera, a laser sensor, a magnetic door sensor, a magnetic window sensor, a door lock sensor, a window lock sensor, or a carbon monoxide sensor.

In some implementations, determining a configuration includes determining at least one of a location for the furniture, a position for the furniture, or an orientation for the furniture.

In some implementations, determining an event includes: based on the sensor data, identifying an event; receiving, from one or more other sensors, additional sensor data; comparing the additional sensor data with the sensor data; and based on the comparison, verifying the event.

In some implementations, determining an event includes: based on the sensor data, identifying multiple potential events; receiving, from one or more other sensors, additional sensor data; comparing the additional sensor data with the sensor data; and based on the comparison, narrowing down the potential events to the event.

In some implementations, the event is one of a fire within the property, water within the property, presence of carbon monoxide within the property, a particular temperature of all or a part of the property, a rate at which a temperature is changing in all or a part of the property, extreme weather near the property, a break-in or attempted break-in, a broken window of the property, a broken door of the property, an open window of the property, an open door of the property, vacancy of the property, high-occupancy of the property, a temperature of an asset within the property, a determination that an asset within the property is in direct sunlight, a fall by an occupant, a time corresponding with a maintenance or work order, activity within a pool on the property, or a pet damaging an asset within the property.

In some implementations, the method further includes identifying features of the property and the location of those features.

In some implementations, the features of the property include at least one of a door, a window, a cooling element, a heating element, or one or more walls.

In some implementations, further includes: determining a current configuration of the furniture; and determining a configuration comprises comparing the location of one or more identified features with the current configuration of the furniture.

In some implementations, the identified features of the property are features of the property that are associated with the event.

In some implementations, the instructions provided to the furniture include the path.

In some implementations, the method includes: receiving, from one or more sensors, new sensor data; based on the sensor data, determining updated instructions for the furniture; and providing, to the furniture, the updated instructions.

In some implementations, the new sensor data indicates at least one of a collision having occurred involving one or more pieces of the furniture, a collision likely to occur involving one or more pieces of the furniture, an end of the event, a new event, or a change to the event; and the updated instructions indicate that one or more pieces of the furniture should stop moving, should pause moving, should move into a new configuration, or should return to their configuration prior to moving.

In another aspect, a system includes: one or more sensors; and a computer having one or more processors. The computer is configured to: receive, from a sensor of the one or more sensors located at a property, sensor data; based on the sensor data, determine an event that is occurring at the property; based on the event that is occurring at the property, determine a configuration for furniture located at the property; and provide, to the furniture, instructions to move into the configuration.

In another aspect, one or more non-transitory computer-readable media storing a computer program, the program comprising instructions that when executed by one or more processing devices cause the one or more processing devices to perform operations including: receiving, by the one or more processing devices and from a sensor located at a property, sensor data; based on the sensor data, determining, by the one or more processing devices, an event that is occurring at the property; based on the event that is occurring at the property, determining, by the one or more processing devices, a configuration for furniture located at the property; and providing, by the one or more processing devices and to the furniture, instructions to move into the configuration.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Many residents equip their homes with security monitoring systems that include one or more sensors and controls for monitoring the resident's property. For example, the monitoring system may include cameras that capture activity within a room or at an access point (e.g., at a door), motion detectors that sense movement within an area of the property, door and window sensors (e.g., to detect whether a door or window is open and/or broken), sensors on utilities (e.g., to detect water usage), or environmental controls (e.g., thermostat settings). In some cases, the monitoring system may include controlled-access entry points that require user-authentication for passage, for example, a door equipped with a keypad requiring a user-specific code for entry. Such monitoring systems are not limited to homes and may be installed in a variety of properties, including commercial buildings as well as other residential buildings (e.g., apartments, condos, etc.).

Motorized furniture is becoming increasingly popular, enabling owners (and occupants) to reconfigure the furniture arrangement of a property with little physical effort. By having access to a variety of sensor data for a particular property, a security monitoring system can leverage the sensor data in order to dynamically reconfigure a property's furniture into a more favorable arrangement.

This disclosed system provides the benefit of dynamically arranging furniture in reaction to an event or determined scenario, instead of requiring the input of a property occupant. This allows the system to quickly react to various events and scenarios where an occupant may not be present, may be preoccupied, or may otherwise not be able to provide arrangement instructions.

The disclosed system also provides the benefit of space utilization by rearranging the motorized furniture for various functions. Unlike previous systems, the disclosed system can predict the function for the property at a particular time and automatically rearrange the furniture in response.

The disclosed system also provides increased safety for occupants of a property. By detecting an event or scenario indicating a danger to a property occupant, the disclosed system can reconfigure the furniture arrangement in such a way as to provide protestation for the occupant or otherwise improve the occupant's safety.

Figure 1A:
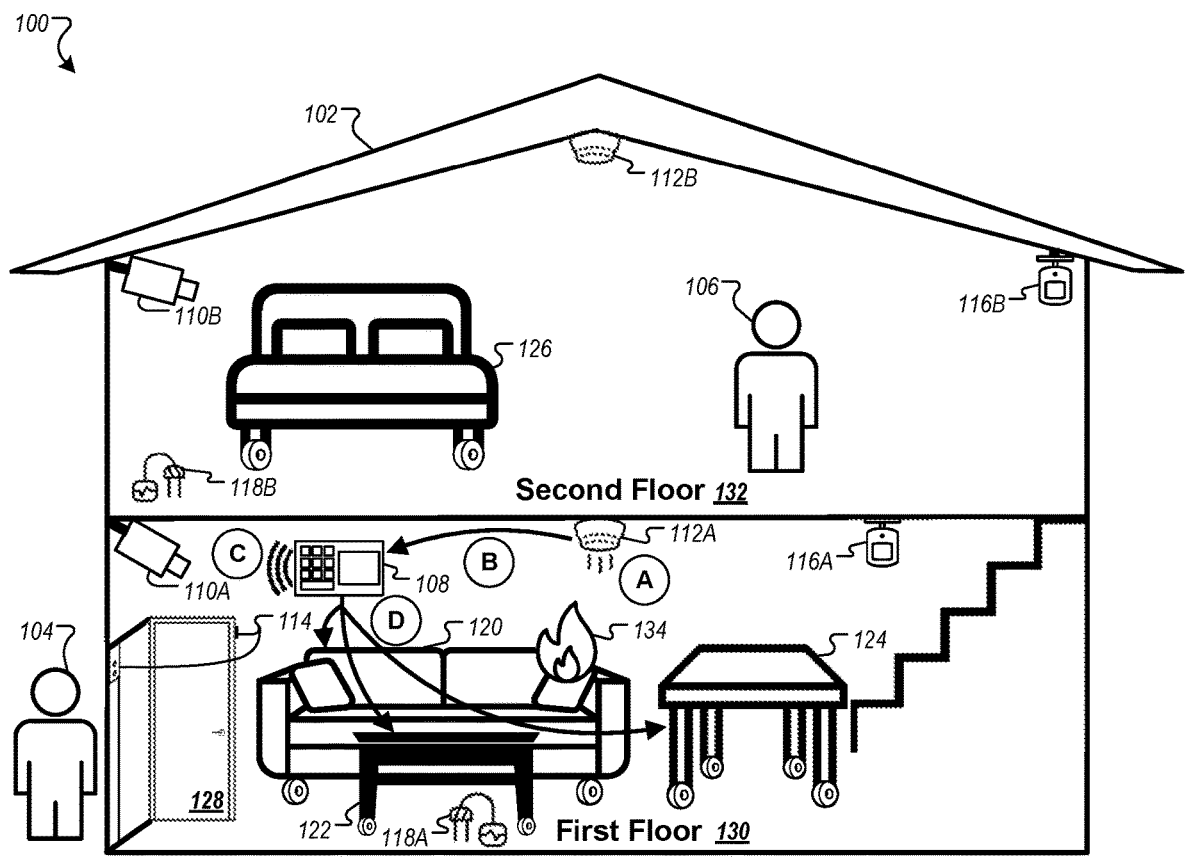
FIGS. 1A through 1B are diagrams that illustrate an example system for dynamically arranging motorized furniture using a security monitoring system.
Figure 1A:
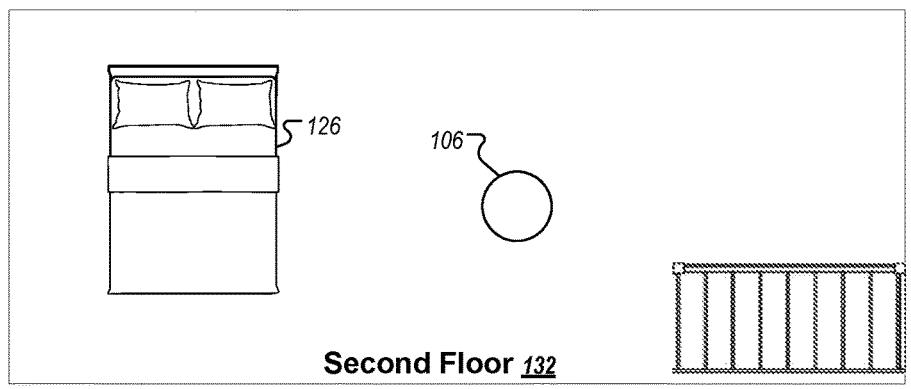
Figure 1A:
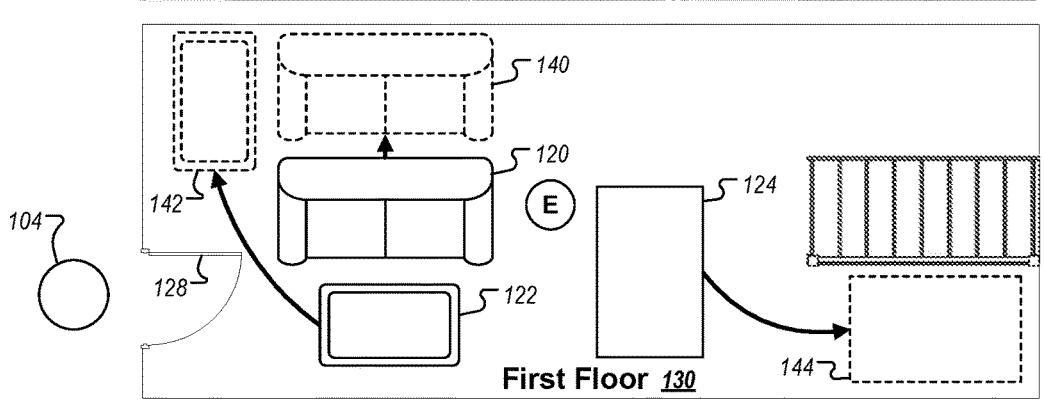
Figure 1B:
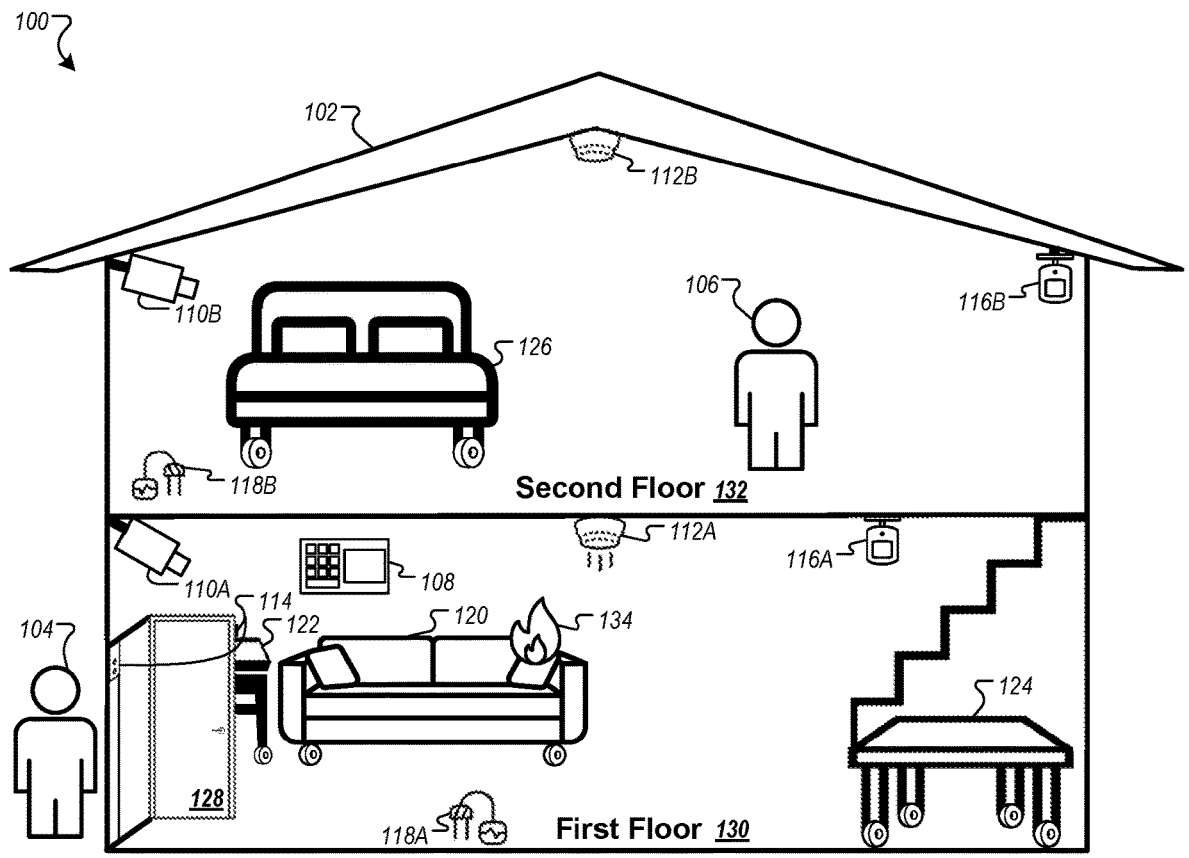
Figure 1B:
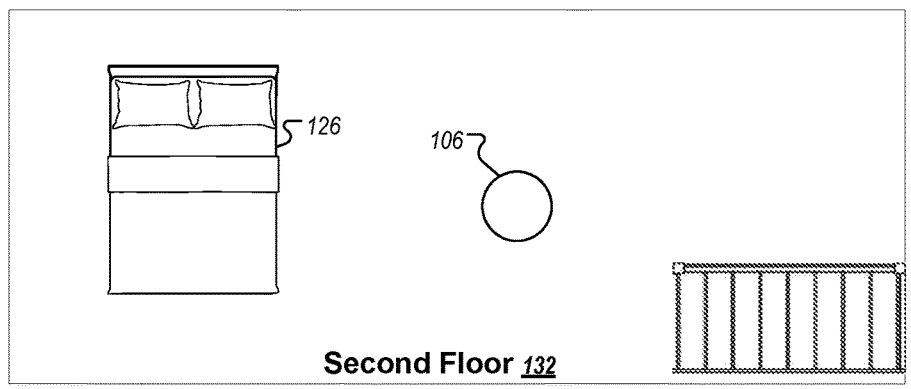
Figure 1B:
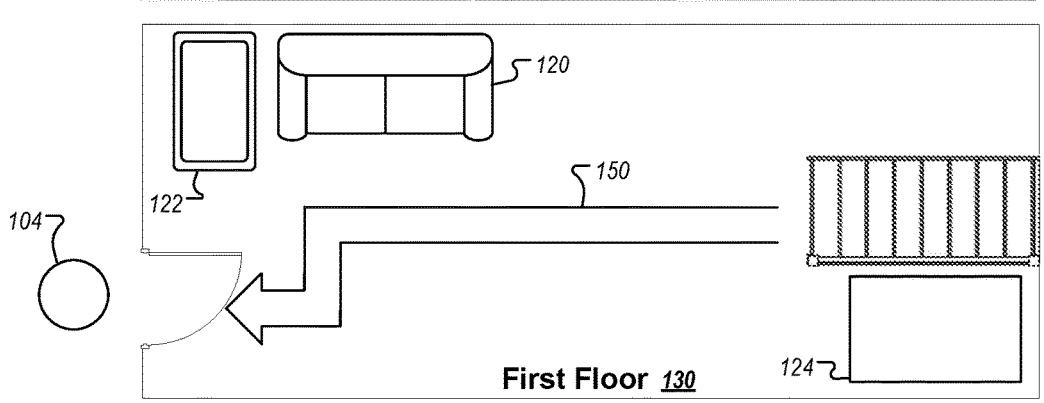
Figure 4:
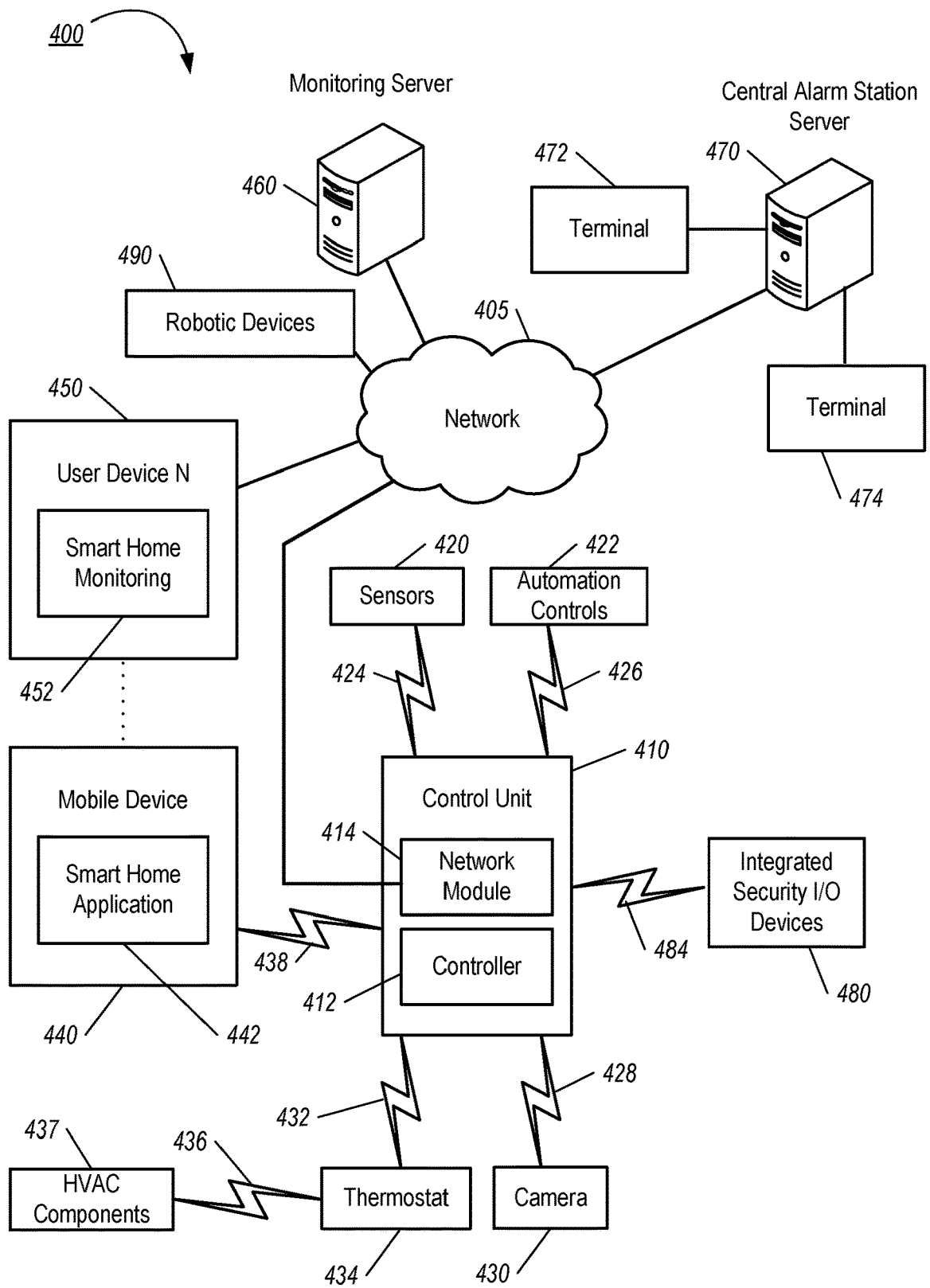
FIG. 4 is a block diagram illustrating an example security monitoring system.

FIGS. 1A through 1B are diagrams that illustrates an example system 100 for dynamically arranging motorized furniture using a security monitoring system 108. FIGS. 1A through 1B each include a side view of the house 102, an overhead view of the first floor 130 of the house 102, and an overhead view of the second floor 132 of the house 102. The system 100 includes the monitoring system 108 having a variety of sensors, a network (e.g., network 405 as shown in FIG. 4), and motorized furniture, such as a motorized couch 120 ("couch 120"), motorized coffee table 122 ("coffee table 122"), motorized kitchen table 124 ("kitchen table 124"), and motorized bed 126 ("bed 126").

The security monitoring system 108 as shown includes a panel which an occupant, such as first occupant 104 or second occupant 106, may interact with through a microphone, a screen or touchscreen, and/or buttons. The security monitoring system 108 may include and communicate with various sensors, such as cameras 110A and 110B, smoke detectors 112A and 112B, door sensor 114, motion sensors 116A and 116B, and moisture sensors 118A and 118B. Cameras 110A and 110B may be visible-light cameras, infrared-light cameras (IR cameras), or a combination of the two. In some implementations, may include additional sensors, such as, for example, thermostat(s), window sensor(s), carbon monoxide sensor(s), door lock sensor(s), window lock sensor(s), laser sensor(s), etc. In some implementations, the security monitoring system 108 communicates with one or more of the various sensors through a wired connection. In some implementations, the security monitoring system 108 can communicate with the various sensors through the network.

The network may be a wireless network, such as a cellular network or a Wi-Fi network.

The motorized furniture ("furniture") may include various motors that can perform a variety of actions. For example, as shown, couch 120, coffee table 122, kitchen table 124, and bed 126 each have motorized wheels which are capable of moving the respective pieces of furniture. In some implementations, one or more pieces of the furniture moves on tracks instead of through the use of motorized wheels. In some implementations, one or more pieces of the furniture moves using motorized treads instead of motorized wheels. In some implementations, the motors used to move the furniture are not located on the furniture itself (e.g., located within a track, located in a ceiling, etc.). In some implementations, the furniture contains motors that produce different actions, such as closing and/or opening doors or drawers of the furniture. The motorized furniture may communicate with the security monitoring system 108 through the network. In some implementations, the furniture is only configured to receive instructions from the security monitoring system 108.

FIG. 1A illustrates a flow of events, shown as stages (A) to (E), with each representing a step in an example process. Stages (A) to (E) may occur in the illustrated sequence, or in a sequence that is different from the illustrated sequence. For example, some of the stages may occur concurrently.

As shown in FIG. 1A, at stage (A), a sensor detects an event. Here, the smoke detector 112A detects smoke and/or heat from a fire 134. In some implementations, the data from other sensors (e.g., cameras 110A and 110B, a thermometer, a thermostat, motion detectors 116A and 116B, etc.) may indicate the occurrence of the fire 134 or other events. For example, if a thermometer detects a temperature outside of a normal range, then it may signal an alert to the security monitoring system 108, which may determine that there is high likelihood of a fire within the house 102. As another example, where camera 110A is an IR camera, an analysis of the camera 110A's feed by the security monitoring system 108 may reveal an abnormal heat signature, indicating that a fire present within house 102 is likely.

At stage (B), the security monitoring system 108 receives a notification from the smoke detector 112A that it has detected smoke and/or heat (and, thus, fire). Based on the notification, the security monitoring system 108 may determine that the fire 134 is located on the first floor 130 of the house 102. For example, the security monitoring system 108 may make this determination based on the smoke detector 112A being located on the first floor 130, and/or by not receiving a notification from smoke detector 113B located on the second floor 132.

As an example, where camera 110A is an IR camera, an analysis of the camera 110A's feed by the security monitoring system 108 may reveal an abnormal heat signature, indicating that a fire present within house 102 is likely. The security monitoring system 108 may use the data from the camera 110A to verify that the fire 134 is present in the house 102.

In some implementations, the security monitoring system 108 may use the sensor data to identify a location the fire 134 or other event. In some implementations, this step is performed at stage (B), where the sensor data that security monitoring system 108 initially receives indicates a location of the fire 134. In other implementations, this step is performed at stage (C), where the security monitoring system 108 accesses data from other sensors. As an example, where camera 110A is an IR camera, the security monitoring system 108 may analyze the obtained image(s) from camera 110A to identify the portions of those images having an abnormal heat signature, and, based on a known location and/or orientation of the camera 110A, determine the location of the fire 134. In this example, the security monitoring system 108 may also have or obtain access to the current locations of the various pieces of the motorized furniture (e.g., from location sensors on the furniture, through image recognition, and/or through access to previous configuration instructions it sent to the furniture). The security monitoring system 108 may then compare the determined location of the fire 134 with the known locations of the various pieces of furniture to determine that the fire 134 is located on the right side of the couch 120. The security monitoring system 108 may take this determination into account in stage (C), when it is determining a new position for the various pieces of the motorized furniture. For example, the security monitoring system 108 may determine that it is best to keep the couch 120 away from the walls of the house 102.

At stage (C), the security monitoring system 108 may access data from other sensors and/or request data from other sensors. The security monitoring system 108 may access and/or request this data in order to verify the event (e.g., fire), verify a location of the event (e.g., where the fire 134 is located, locate where the fire 134 is most intense, locate where the fire 134 has spread, etc.), determine and/or verify the location and position of each of the pieces of furniture, determine the location of walls, determine the location of occupants, determine the location of stationary objects, and/or determine the location of other obstacles (e.g., an open door, such as door 114, a Roomba, a pet, etc.).

At stage (C), the security monitoring system 108 may analyze the sensor data. Here, based on the analysis of data from motion sensor 116b and/or data from camera 110b, the security monitoring system 108 is able to determine a location of second occupant 106. Specifically, an analysis of the motion sensor data from motion sensor 116b may reveal that something is moving on the second floor 132 or has recently moved on the second floor 132. An analysis of the camera data from camera 110b may identify the presence of a person through, for example, image recognition and/or thermal imaging in instances where camera 110b is an IR camera. The security monitoring system 108 may be able to determine an accurate position of the second occupant 106 (e.g., through use of the camera data from camera 110B). In some implementations, the security monitoring system 108 is able to only determine a general area in which the second occupant 106 is located (e.g., that the second occupant 106 is located on the second floor 132). This may be due to the second occupant 106 moving around, making it difficult to pinpoint their location, and/or due to the type of sensor used to detect the second occupant 106 (e.g., if only an analysis of the data from the motion sensor 116b indicates the presence of something moving in the general area).

Here, based on the analysis of data from door sensor 114, the camera 110A, and/or the motion sensor 116A, the security monitoring system 108 may determine that a first occupant 104 is not in the house but is nearby. Specifically, an analysis of the door sensor data from door sensor 114 may indicate that the front door 128 is open and, in some implementations, a time when the door was opened. This time may alternatively be tracked by the security monitoring system 108, which may receive a notification from the door sensor 114 every time the front door 128 is opened. An analysis of the camera data 110A may indicate that no occupant is present on the first floor 130. Similarly, an analysis of the motion sensor data from motion sensor 116A may indicate that no occupant is present on the first floor 130 (though the motion sensor 116A may be potentially set off by other things, such as the fire 134 itself, pets, various machines, etc.).

At stage (C), the security monitoring system 108 may determine a current arrangement of the furniture. In some implementations, in determining a current arrangement of the furniture, the security monitoring system 108 only determines a current position and/or orientation of the pieces of furniture it intends to move. In other implementations, the security monitoring system 108 determines a current position and/or orientation for every piece of motorized furniture.

In some implementations, the security monitoring system 108 determines or tracks the position and/or orientation of each piece of furniture. In these implementations, determining a current arrangement of furniture may involve accessing position instructions it last sent to each of the pieces of furniture (or the pieces of furniture that the security monitoring system 108 intends to move). In some implementations, the security monitoring system 108 determines the position and/or orientation of a piece of furniture by one or more location sensors (e.g., a global positioning system unit), gyroscopes, and/or accelerometers located on or within the piece of furniture. In some implementations, the security monitoring system 108 determines the position and/or orientation of a piece of furniture using one or more sensors of the security monitoring system 108 (e.g., through use of image recognition on camera data from cameras 110A and 110B). In some implementations, the security monitoring system 108 determines the location and/or orientation of a piece of furniture based on a combination of the last position instructions it provided to the piece of furniture and the data from one or more sensors located on or off the piece of furniture.

At stage (C), the security monitoring system 108 determines position instructions for each piece of furniture that it intends to move. The position instructions may contain data indicating a final position and/or orientation for a piece of furniture. The position instructions may also contain data indicating a path for the piece of furniture to take in order to reach its final position and/or orientation. The path may be determined in such a way so that the piece of furniture avoids walls, occupants, other moving pieces of furniture, stationary objects, and/or other obstacles (e.g., pets, Roomba, etc.). The location of walls, occupants, stationary objects, and/or other obstacles may be determined from one or more sensors of the security monitoring system, such as the cameras 110A and 110B. In some implementations, if the security monitoring system 108 detects that a collision is likely to occur with a piece of furniture in the process of moving (as discussed in more detail below with respect to stage (E)), the security monitoring system sends new instructions to the piece of furniture. These new instructions may include instructions to stop movement, to pause movement, to follow an updated path, and/or to move back into its previous position and/or orientation.

Here, the security monitoring system 108 determines new positions and/or orientations for the couch 120, the coffee table 122, and the kitchen table 124. The security monitoring system 108 also determines that the bed 126 does not need to be moved. In determining the new positions, the security monitoring system 108 may try to move the furniture so as to create a clear path (e.g., path 150 as shown in FIG. 1B) for the second occupant to escape. Because the bed 126 is not in the way of the second occupant 106 reaching the stairs/exit, the security monitoring system 108 does not need to send position instructions to bed 126. The determined final position and/or orientation of the couch 120 is position 140. The determined final position and/or orientation of the coffee table 122 is position 142. The determined final position and/or orientation of the kitchen table 124 is position 144.

In some implementations, where the security monitoring system 108 has determined that the fire 134 is located on the right side of the couch 120, the security monitoring system 108 may still determine to reposition couch 120 near the wall of the house 102 at position 140. The security monitoring system 108 may make this determination if it determines that clearing a pathway for the occupant 106 to exit the house 102 is more important than the risk of the fire 134 spreading faster by bringing it closer to a wall of the house 102. As an example, if the security monitoring system 108 determines that there are no occupants within the house 102 or that that there is a sufficiently high likelihood that there are no occupants in the house 102, it may determine that the couch 120 should remain at its present location away from the walls of the house 102 and/or other furniture.

In some implementations, where the second occupant 106 is outside of the house 102 and there are no more occupants in the house, the security monitoring system 108 may determine different positions for the furniture. For example, the security monitoring system 108 may move all the furniture on each of the floors that the fire has not spread to, to a location as far away from the fire 134 as possible (this would also have the benefit of helping to isolate the fire 134 and preventing or slowing its growth and spread). As another example, the security monitoring system 108 may consolidate all of the furniture on each of the floors to slow the spread of fire through the house and limit the effects of a flashover. In this example, any furniture that the fire 134 has already spread to, such as couch 120, may be isolated while the rest of the furniture is consolidated. As another example, the security monitoring system 108 may leave the couch 120 that is on fire in the middle of the first floor 130 (or move it to the direct center of the first floor 130) to keep it away from the walls of the house 102 in order to prevent or slow the spread of the fire 134. Such an arrangement might only be implemented in situations where there is no occupant within the house 102 because the couch 120, when located in the middle of the first floor 130, may interfere with an occupant attempting to reach the exit/front door 128.

At stage (D), the position instructions are provided to each piece of furniture that is to be moved. A position instruction is provided to couch 120 that includes a final position 140 and a path for it to reach the final position 140. A position instruction is provided to coffee table 122 and a path for it to reach the final position 140. A position instruction is provided to kitchen table 124 that includes a final position 144 and a path for it to reach the final position 144. These instructions may be provided to the furniture wirelessly through the network.

At stage (E), each piece of furniture starts moving towards its respective final position (e.g., final positions 140, 142, and 144) along their respective paths. If the security monitoring system 108 detects that a collision is likely to occur with a piece of furniture in the process of moving, the security monitoring system sends new instructions to the piece of furniture. These new instructions may include instructions to stop movement, to pause movement, to follow an updated path, and/or to move back into its previous position and/or orientation. For example, first occupant 104 may have opened door 128 after initial position instructions were sent to coffee table 122. Upon determining that the coffee table 122 is now going to make contact with the door 128 (e.g., through use of camera 110A and/or door sensor 114), the security monitoring system 108 may send an instruction to coffee table 122 to pause movement followed by new position instructions that identify a new path for coffee table 122 to reach its final position 142.

FIG. 1B demonstrates the system 100 after each piece of furniture, of the pieces of furniture that were instructed to be moved, has reached its respective final position and/or orientation. That is, couch 120 has reached its final position 140 (as shown in FIG. 1A), coffee table 122 has reached its final position 142 (as shown in FIG. 1A), and kitchen table 124 has reached its final position 144 (as shown in FIG. 1A). With each piece of furniture is in its respective final position and/or orientation, there are no obstructions between the second occupant 106 and the stairs on the second floor 132 of house 102. In addition, the second occupant 106 now has a clear path 150 from the stairs to the exit/front door 128 on the first floor 130 of house 102.

Figure 2A:
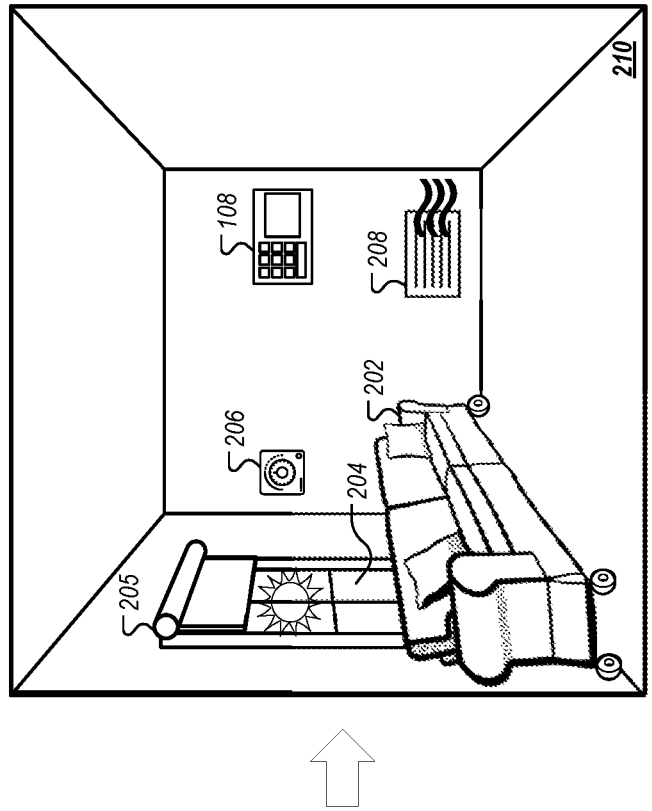
FIGS. 2A through 2D are diagrams that illustrate example scenarios for the dynamic arrangement of motorized furniture using a security monitoring system.
Figure 2A:
Figure 2A:
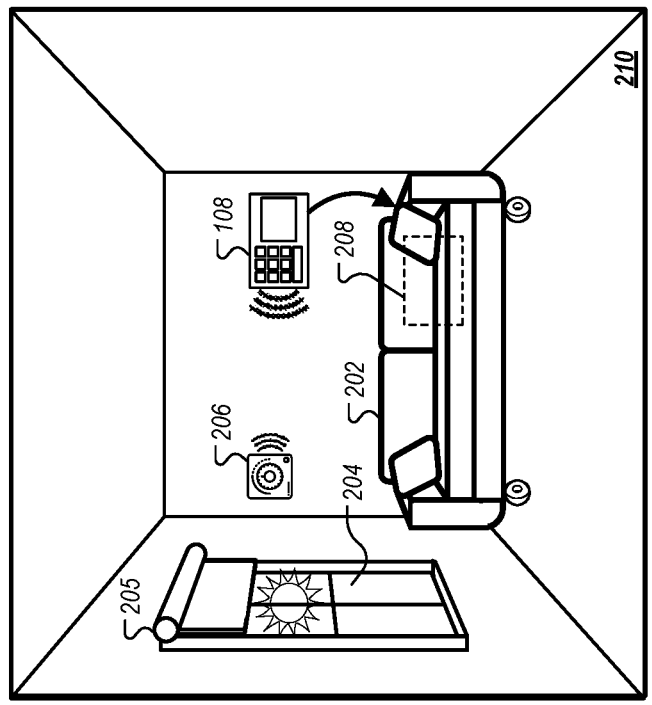

FIG. 2A illustrates a climate control scenario for the dynamic arrangement of motorized furniture using the security monitoring system 108. Here, as shown in the left panel, the security monitoring system 108 includes and communicates with a thermostat 206. Thermostat 206 may include a thermometer to detect a temperature of room 210. As noted above, communication between the security monitoring system 108 and its sensor(s) may occur through a wired connection or wirelessly through a network. The security monitoring system 108 is also able to communicate with a motorized couch 202 ("couch 202") through, for example, a network.

In the example of FIG. 2A, the security monitoring system 108 detects a climate control scenario where increased airflow is needed or desired to cool the room 210. As shown, there is a vent 208 in room 210 that is being blocked or congested by couch 202. The initial location and/or orientation of the couch 202 may be the preferred location of a resident. For example, the couch 202 in this location and/or orientation may provide the best viewing angle for watching a TV in the room. Due to, for example, sunlight coming through window 204, the temperature in the room 210 increases. The thermostat 206 detects the increase in temperature. Due to, for example, a rapid increase in temperature or due to a temperature level being met, the thermostat 206 sends a notification to the security monitoring system 108 indicating that the temperature is rapidly increasing and/or it is too high. Alternatively, the security monitoring system 108 may be fed the temperature readings from thermostat 206 and make the determination that the temperature is rising rapidly and/or is too high based on an analysis of the temperature readings.

In response to the indication or determination that the temperature of room 210 is rising rapidly and/or is too high, the security monitoring system 108 may determine that the couch 202 should be moved in order to increase the airflow from vent 208 in an effort to reduce the temperature of room 210. In addition, the security monitoring system 108 may identify the sunlight coming through window 204 as wholly or partially responsible for the increased temperature based on, for example, the time of day by using an internal clock of the security monitoring system 108 or by using one or more additional sensors (e.g., a light sensor located on the window 204). As such, the security monitoring system 108 may determine that the couch 202 should be moved in front of the window 204 in order to block some of the sunlight coming through the window 204 in an effort to reduce the temperature of room 210.

The security monitoring system 108 may determine and/or access the location of a building's features, such as vents (e.g., vent 208), windows (e.g., window 204), doors (e.g., door 128 as shown in FIGS. 1A-1B), other cooling elements, other heating elements, location of walls (e.g., as all or part of a floor plan), etc., in a number of ways. For example, the locations of these features may be manually entered by an occupant, an owner, or an administrator through a panel of the security monitoring system 108 or through a computing device that is able to communicate with the security monitoring system 108. The locations of these features may also or alternatively be determined by the security monitoring system 108 through various sensors, such as cameras (e.g., cameras 110A and 110B as shown in FIGS. 1A-1B), window sensors, door sensors (e.g., door sensor 114 as shown in FIGS. 1A-1B), laser sensors, or combinations thereof.

In determining that the couch 202 should be moved in order to increase the airflow from vent 208, the security monitoring system 108 first determines a current position and/or orientation of couch 202. The security monitoring system 108 may make this determination in accordance with the method(s) described above with respect to FIG. 1A.

By comparing the vent 208's location with the position and/or orientation information of couch 202, the security monitoring system 108 can determine that couch 202 is in such a position and/or orientation with respect to the vent 208 so as to interfere with the airflow in room 210 from vent 208. By comparing the window 204's location with the position and/or orientation information of couch 202, the security monitoring system 108 can determine a new position and/or orientation for couch 202 so that it can partially block the window 204.

With this final position, the security monitoring system 108 can determine a path for the couch 202 to take to reach the final position. The security monitoring system 108 may make this determination in accordance with the method(s) described above with respect to FIG. 1A.

The security monitoring system 108 provides the position instructions, having the final position information and path to reach the final position, to couch 202. Couch 202 proceeds to move and reposition itself away from the vent 208 and in front of the window 204. In the right panel of FIG. 2A, the couch 202 is depicted in its final position. With couch 202 in this position and/or orientation, the vent 208 is able to provide airflow or increased airflow, and the sunlight coming through window 204 is partially blocked. This may result in a reduction of the temperature of room 210, a stop to the rise in temperature of room 210, or a slowdown in the rise of temperature of room 210.

In other climate control scenarios, a thermostat or other temperature sensor may detect that a building or particular area of a building is too cold/rapidly cooling and/or the security monitoring system 108 may determine that a building or particular area of a building is too cold/rapidly cooling. In these scenarios, the security monitoring system 108 may make an effort to increase the temperature of a building or a particular area of a building (e.g., room 210). For example, if the security monitoring system 108 determines that the sun is out or that the sun is likely to be out (e.g., based on a time of day), the security monitoring system 108 may instruct furniture to move away from the windows to allow more sunlight to access the building or a particular area of the building.

Similarly, in the example of FIG. 2A, if the room 210 is actually determined to be too cold or rapidly cooling, the security monitoring system 108 may instruct the couch 202 to still move away from the vent (as it would be providing hot air in this scenario) but not block the window 204. In such a scenario, the couch may be instructed to move against the right wall so that it does not partially block the window 204.

In some implementations, the security monitoring system 108 is able to adjust the blinds 205 of window 204. In these implementations, in addition to or instead of moving the couch 202 away from the vent 208 and in front of the window 204, the security monitoring system 108 may instruct the blinds 205 to be lowered. By lowering the blinds 205, the amount of sunlight coming through the window 204 will be decreased, which will help to slow the increase of room 210's temperature, halt the increase of room 210's temperature, or decrease the temperature of room 210.

In some implementations, the security monitoring system 108 is able to adjust the vent 208. In these implementations, the security monitoring system 108 may be able to adjust the vent 208 such that it is in a closed state, open state, or partially open state. Where a high temperature is detected or high rate of temperature increase is detected, the security monitoring system 108 may fully open the vent 208 if it determines that the air conditioning is on. Where a high temperature is detected or high rate of temperature increase is detected, the security monitoring system 108 may fully close the vent 208 if it determines that the heat is on. Where a low temperature is detected or high rate of temperature decrease is detected, the security monitoring system 108 may fully open the vent 208 if it determines that the heat is on. Where a low temperature is detected or high rate of temperature decrease is detected, the security monitoring system 108 may fully close the vent 208 if it determines that the air conditioning is on.

In other climate control scenarios, the security monitoring system 108 may determine that a building or a particular area of a building is vacant and may instruct the furniture to assume an energy efficient configuration. In these scenarios, the security monitoring system 108 may instruct the furniture to move to new positions that do not block or partially block heating and/or cooling elements and do not obstruct air circulation.

The security monitoring system 108 may determine that the a building or a particular area of building is vacant by an arming state of the security system (e.g., if security system is armed), inferring such from an extended period of inactivity (e.g., through an analysis of information from door sensors, window sensors, motion sensors, cameras, or other sensors which indicate(s) that no occupants have been in the building or a particular area of the building for a certain amount of time), is explicitly known from property management software (PMS) integrations, is predicted based on a learned schedule of the occupants (e.g., based on the time of day when occupants normally leave as indicated, for example, by an analysis of data from the door sensors), or a combination thereof.

Figure 2B:
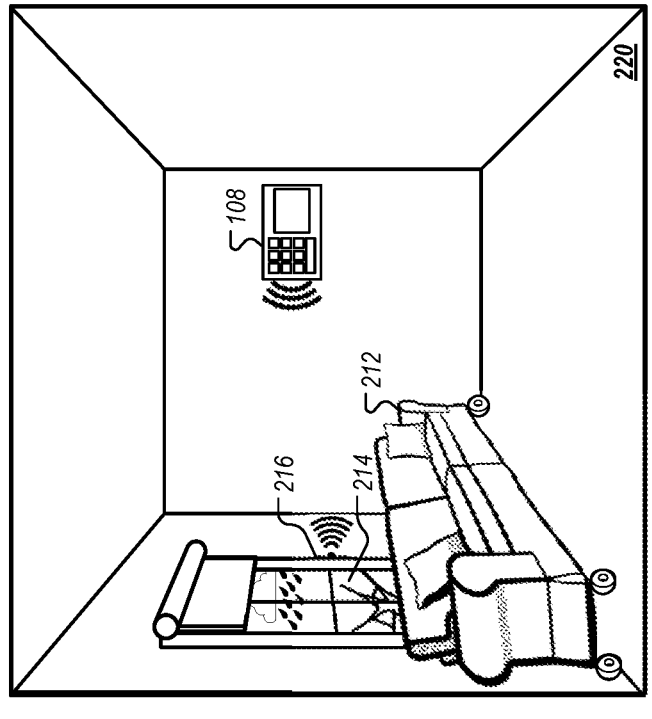
Figure 2B:
Figure 2B:
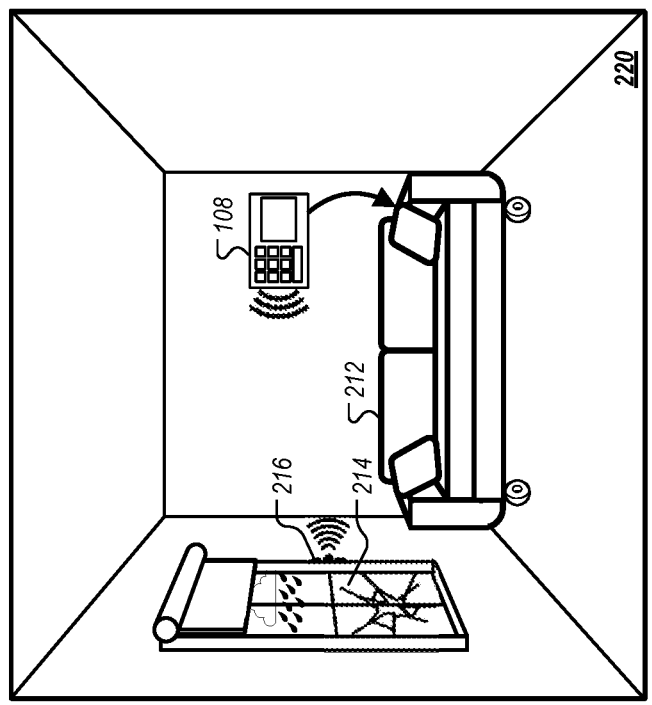

FIG. 2B illustrates an extreme weather scenario for the dynamic arrangement of motorized furniture using the security monitoring system 108. Here, as shown in the left panel, the security monitoring system 108 includes and communicates with a window sensor 216. The window sensor 216 may be able to detect whether the window 214 is open or if it is broken. The window sensor 216 may be a two-piece magnetic sensor, a window break sensor (e.g., that uses an audio microphone which can recognize the frequency of broken glass), or a combination of the two. As noted above, communication between the security monitoring system 108 and its sensor(s) may occur through a wired connection or wirelessly through a network. The security monitoring system 108 is also able to communicate with a motorized couch 212 ("couch 212") through, for example, a network.

In the example of FIG. 2B, the security monitoring system 108 detects or determines an extreme weather scenario. Here, the security monitoring system 108 detects or determines an extreme weather scenario by receiving a notification from window sensor 216 that the window 214 is broken (or has been opened). Alternatively, the security monitoring system 108 may be fed the output data from window sensor 216 and make the determination that the window 214 is broken (or open). In some implementations, the security monitoring system 108 may detect or determine an extreme weather scenario by acquiring or accessing weather data for the area in which the building having room 220 is located.

In some implementations, in order to differentiate an extreme weather scenario from other scenarios/determine that that the window 214 is broken by extreme weather instead of by other possible causes (e.g., a burglar), the security monitoring system 108 uses data provided from other sources to rule out other causes and/or verify extreme weather as the cause. For example, the security monitoring system 108 may acquire or access data from other sensors (e.g., cameras, motion sensors, etc.) to determine that a person is not in the room 220 or did not enter the room 220, and, using that information, that there was likely no break-in. The security monitoring system 108 may also acquire or access, through an internet connection for example, weather data. Using the acquired or accessed weather data, the security monitoring system 108 may verify that there is bad weather in the area in which the building having room 220 is located and that this weather was the likely cause of the damage to window 214.

In some implementations, the response to an event (e.g., window 214 breaking) may be the same for various scenarios. For example, the security monitoring system 108 may determine that couch 212 should be moved in front of window 214 regardless of whether the cause of the break was due to extreme weather or due to, for example, a break-in. This may be because moving the couch 212 in front of the window 214 protects an occupant of the building in which room 220 is located or the property within the building from both the extreme weather and a would-be burglar. In these implementations, where the response is determined to be the same, the security monitoring system 108 might not waste time determining and/or verifying the cause of the break (or might wait to make such a determination after it is has provided position instructions to couch 212).

In response to the indication or determination that there is an extreme weather scenario (or, alternatively, just in response to a determination that window 214 is broken), the security monitoring system 108 determines that the couch 212 should be moved in front of window 214 in an effort to protect any occupants of the building having room 220 or property in the building from the extreme weather.

The security monitoring system 108 may determine and/or access the location of a building's features, such as vents, windows (e.g., window 214), doors (e.g., door 128 as shown in FIGS. 1A-1B), other cooling elements, other heating elements, location of walls, etc., in a number of ways as discussed above with respect to FIG. 2A. The security monitoring system 108 may use the identified features of the building to create a blueprint for that building. Alternatively, a blueprint having some or all of these features may be provided to the security monitoring system 108.

In determining that the couch 212 should be moved in order to provide protection from extreme weather, the security monitoring system 108 first determines a current position and/or orientation of couch 212. The security monitoring system 108 may make this determination in accordance with the method(s) described above with respect to FIG. 1A.

By comparing the window 214's location with the position and/or orientation information of couch 212, the security monitoring system 108 can determine a new position and/or orientation for couch 212 so that it can partially block the window 214.

With this final position, the security monitoring system 108 can determine a path for the couch 212 to take to reach the final position. The security monitoring system 108 may make this determination in accordance with the method(s) described above with respect to FIG. 1A.

The security monitoring system 108 provides the position instructions, having the final position information and path to reach the final position, to couch 212. Couch 212 proceeds to move and reposition itself in front of the window 214. In the right panel of FIG. 2B, the couch 212 is depicted in its final position. With couch 212 in this position and/or orientation, the broken window 214 is partially blocked. This may provide increased protection to any occupants or property of the building in which room 220 is located from, for example, shattered glass.

In other extreme weather scenarios, the security monitoring system 108 may determine the occurrence of extreme weather from acquiring or accessing weather data alone. In these scenarios, the security monitoring system 108 may not wait until any damage (e.g., a broken window) occurs, but, instead, instruct one or more pieces of furniture (e.g., couch 212) to block any windows (e.g., window 214) as a precaution.

In other extreme weather scenarios, a system may include motorized furniture that is able to anchor itself to the building (e.g., to a floor of a building, to a wall of a building, to a ceiling of a building, etc.). In these scenarios, the security monitoring system 108 may instruct one or more pieces of furniture to anchor themselves when an extreme weather scenario is detected. By having the one or more pieces of furniture anchored, they can serve as protection for occupants of the building. By having the one or more pieces of furniture anchored, they will be less susceptible to the extreme weather and will pose less of a danger to occupants of the building.

In some implementations, the motorized furniture may also be able to change its shape. For example, a piece of motorized furniture may include and be able to extend a table. In extreme weather scenarios, the security monitoring system 108 may instruct the piece of furniture to extend its table and anchor the table to the floor of room 220 for example.

Figure 2C:
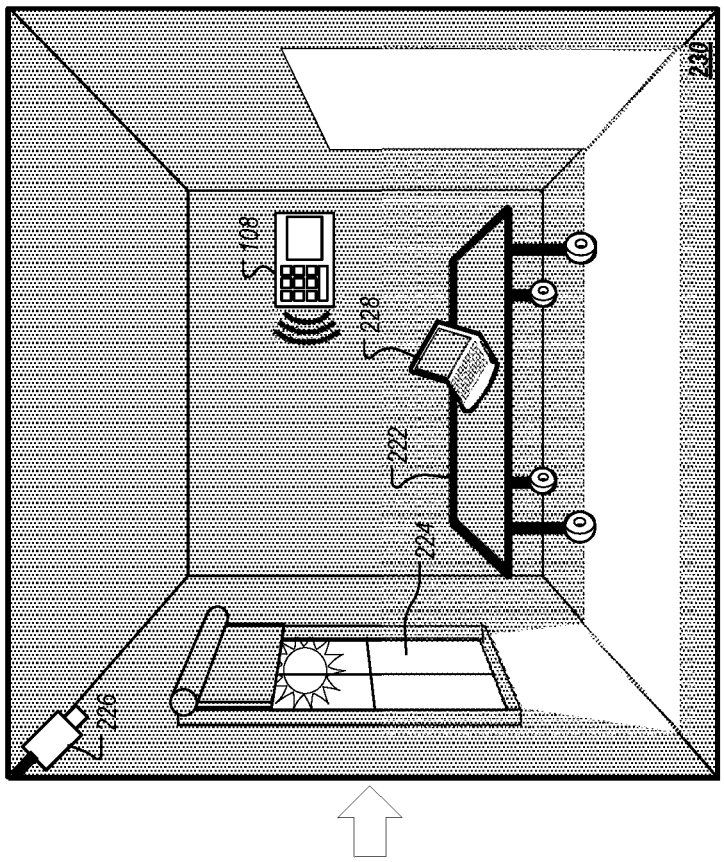
Figure 2C:
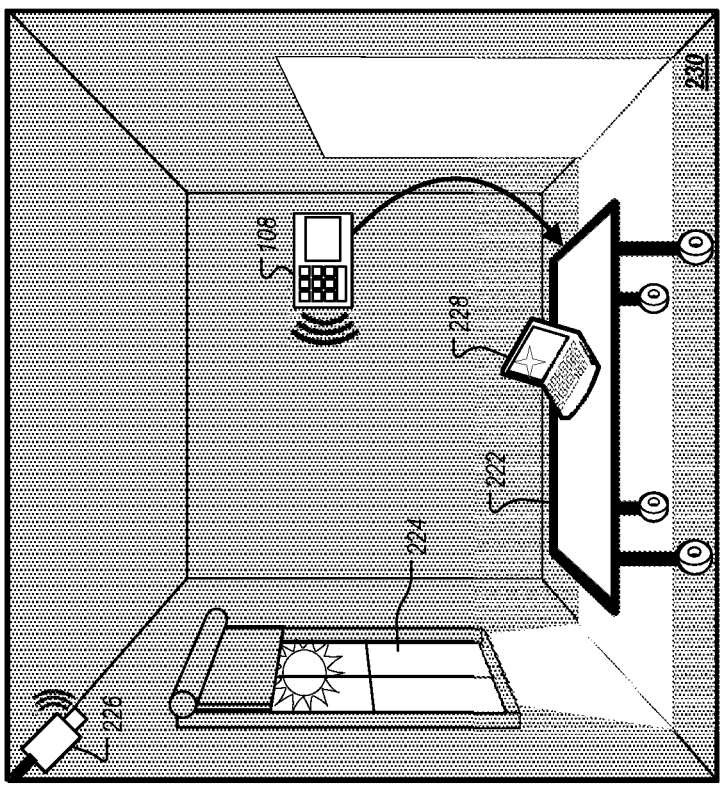

FIG. 2C illustrates an asset protection scenario for the dynamic arrangement of motorized furniture using the security monitoring system 108. Here, as shown in the left panel, the security monitoring system 108 includes and communicates with a camera 226. The camera 226 may be a visible-light camera or may be an infrared-light camera (IR camera). As noted above, communication between the security monitoring system 108 and its sensor(s) may occur through a wired connection or wirelessly through a network. The security monitoring system 108 is also able to communicate with a motorized table 222 ("table 222") through, for example, a network.

In the example of FIG. 2C, the security monitoring system 108 detects or determines an asset protection scenario. Here, the security monitoring system 108 detects or determines an asset protection scenario by receiving a notification from camera 226 that an asset, laptop 228, has been left in the sunlight (when camera 226 is a visible-light camera) coming through window 224 and/or is too hot (when camera 226 is an IR camera). Alternatively, the security monitoring system 108 may be fed the output data from camera 226. Using this data, the security monitoring system 108 may identify an asset (e.g., laptop 228) using image recognition for example and determine that the asset has been left in the sunlight and/or is too hot.

In response to the indication or determination that there exists an asset protection scenario, the security monitoring system 108 determines that the table 222 should be moved so as to bring the laptop into the shade or a cooler part of the room 230 in an effort to protect the laptop 228.

The security monitoring system 108 may determine and/or access the location of a building's features, such as vents, windows (e.g., window 224), doors (e.g., door 128 as shown in FIGS. 1A-1B), other cooling elements, other heating elements, etc., in a number of ways as discussed above with respect to FIG. 2A.

In determining that the table 222 should be moved in order to protect the laptop 228, the security monitoring system 108 first determines a current position and/or orientation of the table 222. The security monitoring system 108 may make this determination in accordance with the method (s) described above with respect to FIG. 1A. The security monitoring system 108 may also access and analyze data from camera 226 to determine a location of the laptop 228 with respect to table 222. The security monitoring system 108 may use data from camera 226 and/or data from other sensors to determine an area of room 230 that the table 222 could be moved to in order to bring the laptop 228 out of direct sunlight. Alternatively, the security monitoring system 108 may use data from camera 226 and/or data from other sensors to determine an area of room 230 that is cooler and which the table 222 could be moved to. This area will serve as the final position for table 222.

With this final position, the security monitoring system 108 can determine a path for the table 222 to take to reach the final position. The security monitoring system 108 may make this determination in accordance with the method(s) described above with respect to FIG. 1A.

The security monitoring system 108 provides the position instructions, having the final position information and path to reach the final position, to table 222. Table 222 proceeds to move and reposition itself in the shade/cooler part of the room 230. In the right panel of FIG. 2C, the table 222 is depicted in its final position. With table 222 in this position and/or orientation, the laptop 228 is out of direct sunlight/in a cooler part of the room 230. This may protect the laptop from exposure to direct sunlight and/or from heat damage.

In some implementations, the security monitoring system 108 may move the table 222 to a position where the direct sunlight cannot reach the laptop throughout the day. The security monitoring system 108 may send position instructions to table 222 at sunrise or at a time when the sunlight coming through window 224 would reach the laptop 228. Similarly, the security monitoring system 108 may send additional position instructions to table 222 at sunset or at a time when the sunlight coming through window 224 would not reach the laptop 228 so that the table 222 goes back to its original position. As an example, the original position of the table 222 may be a preferred position as selected by a resident.

In some implementations, the security monitoring system 108 may move the table 222 to a position where it has determined that the direct sunlight has already been and is not currently at. The security monitoring system 108 may make this determination based on an analysis of video feed from the camera 226 (e.g., from that day or from one or more previous days), a time of day, and/or a time of year.

In other asset protection scenarios, the security monitoring system 108 may determine that the house is vacant or determine with a high degree of likelihood that the house is vacant (e.g., based on, or in part on, an arming state of the security monitoring system 108, one or more motion detectors, one or more cameras, etc.). In response, the security monitoring system 108 may identify assets that are valuable (e.g., electronics, jewelry, etc.) and their locations. Once the assets are identified and located, the security monitoring system 108 may determine if the assets can be hidden. This determination may involve determining if an asset is located on or within a piece of motorized furniture, or if an asset can be otherwise hidden by a piece of motorized furniture. Once a determination is made, the security monitoring system 108 proceeds to send instructions to the furniture in accordance with the disclosed system.

For example, the security monitoring system 108 may identify a laptop (e.g., laptop 228) on a piece of motorized furniture (e.g., table 222) and determine that the table should be moved in order to keep the laptop away from a window (e.g., window 224) in order to keep the laptop out of sight. As another example, jewelry may be placed on a piece of motorized furniture that has motorized doors. If the door of the furniture is open at the time that vacancy is determined, the security monitoring system 108 may determine that the doors of the furniture should be closed to hide the jewelry.

Figure 2D:
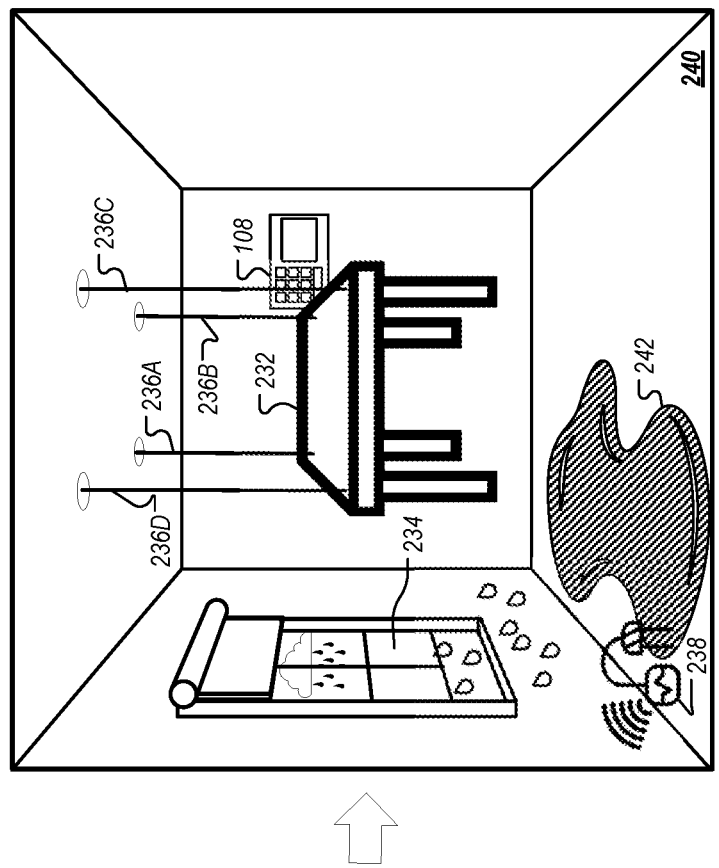
Figure 2D:
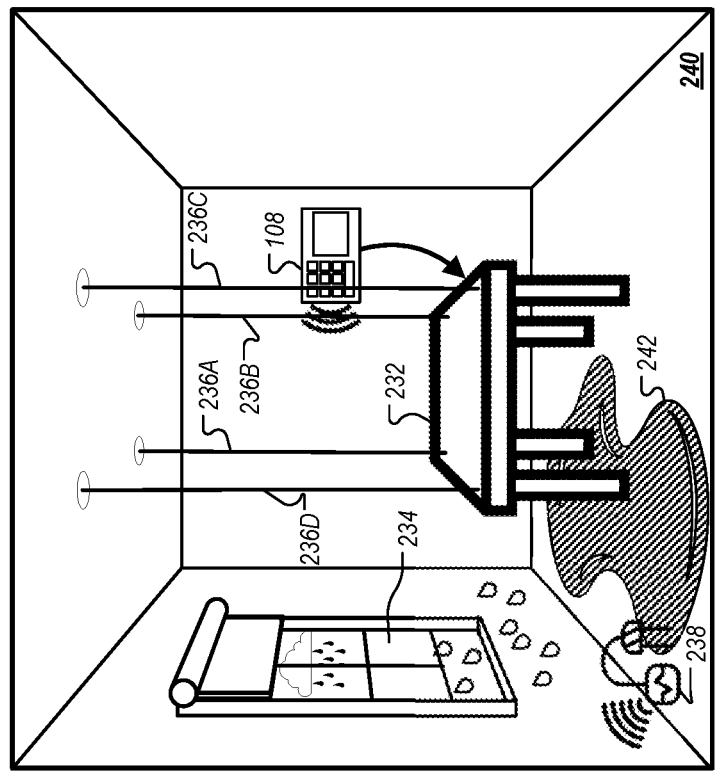

FIG. 2D illustrates another asset protection scenario for the dynamic arrangement of motorized furniture using the security monitoring system 108. Here, as shown in the left panel, the security monitoring system 108 includes and communicates with a moisture sensor 238. Moisture sensor 238 may be a water detector. Moisture sensor 238 is able to detect moisture on the floor of room 240. As noted above, communication between the security monitoring system 108 and its sensor(s) may occur through a wired connection or wirelessly through a network. The security monitoring system 108 is also able to communicate with a motorized table 232 ("table 222") through, for example, a network. Table 232 includes cables 236A-236D. These cables are secured to the corners of table 232 and are able to be drawn so that the table 232 can be lifted towards the ceiling of room 240. The motors used to draw the cables 236A-236D may be located in the ceiling of room 240.

In the example of FIG. 2D, the security monitoring system 108 detects or determines an asset protection scenario. Here, the security monitoring system 108 detects or determines an asset protection scenario by receiving a notification from moisture sensor 238 the presence of water 242 on the floor of room 240. This would trigger an asset protection scenario because assets, such as table 232, may suffer water damage as a result of water 242. Alternatively, the security monitoring system 108 may be fed the output data from moisture sensor 238. Using this data, the security monitoring system 108 may determine the presence of water 242 on the floor of room 240.

In response to the indication or determination that there exists an asset protection scenario, the security monitoring system 108 determines that the table 232 should be moved so that it is no longer in contact with water 242 in an effort to prevent it from suffering water damage.

The security monitoring system 108 may determine and/or access the location of a building's features, such as vents, windows (e.g., window 234), doors (e.g., door 128 as shown in FIGS. 1A-1B), other cooling elements, other heating elements, etc., in a number of ways as discussed above with respect to FIG. 2A.

In determining that the table 232 should be moved in order to prevent contact between the table 232 and the water 242, the security monitoring system 108 may first determines a current position of the table 232. In some implementations, the current position of the table 232 is associated with a binary value and determining a current position involves determining whether the table 232 is currently in contact with the floor of the room 240 or if it is currently lifted off the floor of the room 240 (e.g., there is single preset height that the table 232 is lifted to). In these implementations, if the security monitoring system 108 determines that the table 232 is currently in contact with the floor, it may send instructions to table 232 to lift itself off the floor to its final position (e.g., to a preset height). Where a preset height is used for a lift position, the preset height may be, for example, 4 inches off the floor, 2 feet off the floor, 5 ft off the floor, 8 ft off the floor, the maximum height off the floor (e.g., difference between the table height and the ceiling height). Where a preset height is not used for a lift position, the table 232 may lift itself until it comes into contact with a ceiling of room 240. This lift position may serve as the final position for table 232.

In other implementations, the current position of the table 232 is associated with a non-binary value and determining a current position involves determining a current height of the table 232 or a current height of the table 232 off the floor of room 240. For example, the security monitoring system 108 may determine that the table 232 is in contact with the floor of room 240, is lifted 2 feet off the floor, is lifted 5 feet off the floor, is lifted the maximum height off the floor, etc. In these implementations, the security monitoring system 108, through one or more sensors (e.g., one or more moisture sensors arranged vertically at different heights), may also determine a height of water 242. Using the height of water 242, the security monitoring system 108 may determine a new position (e.g., new height) for the table 232. For example, if the security monitoring system 108 determines that the height of water 242 is only 4 inches, it may instruct the table 232 to be lifted 1 foot off the ground. This new position may serve as the final position for table 232.

The security monitoring system 108 provides the position instructions, having the final position information, to table 232. Table 232 proceeds to lift itself to the final position in room 230 through cables 236A-236D. In the right panel of FIG. 2C, the table 232 is depicted in its final position. With table 232 in this position, the table 232 is no longer in contact with water 242. This may protect the table 232 from water damage.

In other asset protection scenarios, the security monitoring system 108 may determine or detect water 242 on the floor of room 240 or, in general, a water leak. In response, the security monitoring system 108 may instruct one or more pieces of furniture to consolidate in an effort to protect the one or more pieces of furniture from water damage. In response, the security monitoring system 108 may instruct a murphy bed to lift up. In response, the security monitoring system 108 may instruct one or more pieces of furniture that move on rails to move to a new position away from the water 242.

The security monitoring system 108 may also identify instances where a maintenance work order is scheduled for a monitored property, or where a maintenance worker is completing a work order within a monitored property. In these scenarios, through PMS integrations, the security monitoring system 108 accesses scheduled work orders. Through the access of work orders, the security monitoring system 108 may obtain a type of service to be performed (e.g., painting, carpet cleaning, electrician, etc.). In these scenarios, the furniture may be reconfigured into a work-order friendly arrangement prior to maintenance and/or work being performed. For example, one or more pieces of furniture may be lifted off the floor of a property so the property's carpets can be easily cleaned. As another example, the furniture may be consolidated to minimize the exposed surface area of the furniture during painting. As another example, the furniture may be repositioned away from a breaker box so an electrician has easy access.

The security monitoring system 108 may identify instances where an intrusion into a monitored property is taking place. The security monitoring system 108 may detect intrusion through, for example, cameras, motion detectors, window or door sensor, window or door lock sensors, etc. In addition, the security monitoring system 108 may use an arming state of the system, a failure to turn off an arming state (e.g., within a set period of time), or other information to distinguish an intruder from an occupant. In these scenarios, the furniture may be reconfigured so as to prevent access to the property through an entrance or possible entrance, such as a door or window. In these scenarios, the furniture may also or alternatively be reconfigured so as to get into the path of an intruder (e.g., if they have already obtained entry). This may buy the occupants of the property some time to escape.

The security monitoring system 108 may also identify instances where there is a high-occupancy of people within a monitored property. In these scenarios, the furniture may be reconfigured so as to maximize the space available, and/or to hide or otherwise protect fragile assets. The security monitoring system 108 may detect or determine a high-occupancy scenario by using, for example, cameras to identify a number of occupants (e.g., that exceeds a preset number of occupants), or through use of multiple motion detectors in different parts of a property. When a high-occupancy scenario is determined or detected, the security monitoring system 108 may configure the furniture so that the number of seats matches the number of occupants, so, for example, no unneeded seats are taking up floor space. A high-occupancy scenario may be triggered by the detection of a preset number of occupants (e.g., eight people). Once triggered, the security monitoring system 108 may instruct that fragile assets (e.g., picture frames, table lamps, electronics, etc.) are tucked away, moved from the common space, or otherwise hidden to prevent damage.

The security monitoring system 108 may also identify instances where an occupant of a monitored property is unwell. In these scenarios, the furniture may be reconfigured so as to bring furniture or assets located on furniture (e.g., a phone) closer to an occupant of the property experiencing health issues. For example, the security monitoring system 108 may detect that an occupant has fallen through the use of one or more sensors, such as a camera. In some implementations, the security monitoring system 108 is able to distinguish between a non-emergency fall and an emergency fall. This distinction may be made, for example, by detecting whether or not the occupant was able to pick themselves up within a preset period of time. When the fall is determined to be a non-emergency fall, the security monitoring system 108 may instruct that a chair/stool/handrail be repositioned closer to the occupant who fell so he or she can use the furniture as leverage to stand back up. When the fall is determined to be an emergency fall, the security monitoring system 108 may instruct furniture on which an emergency button, a phone, or pull cord is located closer to the occupant who fell so he or she can signal for help.

The security monitoring system 108 may identify instances where a pet is damaging property within a monitored property. In these scenarios, the furniture may be reconfigured so as to move away from a pet that is currently chewing or otherwise destroying a piece of furniture. The security monitoring system 108 may detect the harm to the furniture by a pet through use of one or more sensors, such as a camera. For example, through use of a camera and/or one or more other sensors, the security monitoring system 108 can identify a pet or identify an object with a high degree of likelihood of being a pet. The security monitoring system 108 may determine that an object is actually a pet by, for example, determining a size of an object using a visible-light camera, determining a shape of the object using a visible-light camera, determining that the object is moving using a visible light camera and/or a motion detector, determining that the object is emitting sounds using a microphone, and/or using an IR camera to obtain a heat signature of the object and determining that the heat signature matches that of a living creature. The security monitoring system 108 may determine that the pet is doing harm to a piece of furniture if it detects that the identified pet is near the piece of furniture and the piece of furniture is being moved. The security monitoring system 108 may determine that the piece of furniture is being moved through one or more location sensors on the piece of furniture (e.g., GPS) or through analysis of the video feed of one or more cameras. The security monitoring system 108 may determine that the pet is doing harm to a piece of furniture through recognition of an action by the pet associated with harm to furniture (e.g., chewing). The security monitoring system 108 may recognize this action through analysis of the video feed of one or more cameras. The security monitoring system 108 may determine that the pet is doing harm to a piece of furniture through a particular noise that the pet is making or creating (e.g., a ripping sound, a growling sound, etc.). The security monitoring system 108 may obtain the sounds through a microphone and may compare the obtained sounds with stored sounds that are associated with harm to furniture.

Figure 3:
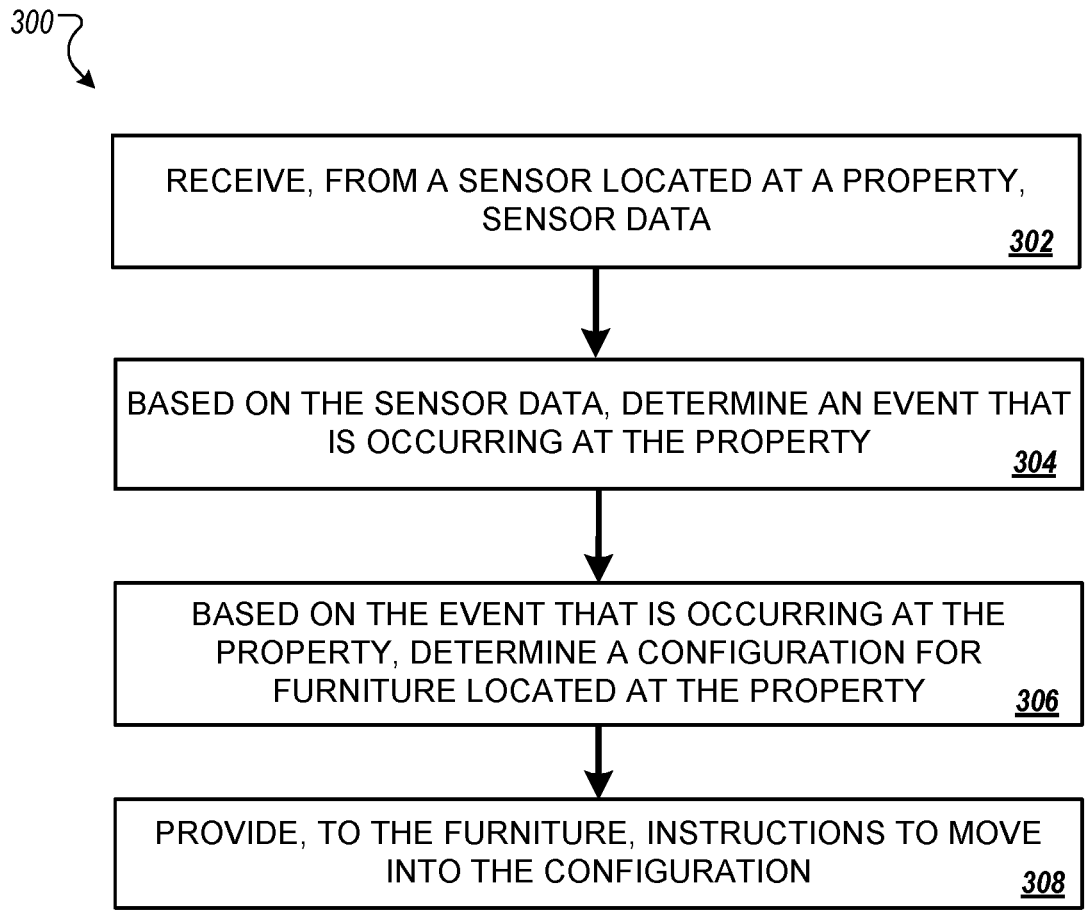
FIG. 3 is an example process for dynamically arranging motorized furniture.

FIG. 3 is an example process 300 for dynamically arranging motorized furniture. The process 300 can be performed, at least in part, using the security monitoring system 108 described herein.

In the process 300, a computer system receives, from a sensor located at a property, sensor data (302). The computer system may be the security monitoring system 108 as shown in FIGS. 1A-2D or part of the security monitoring system 108. The computer system may be system 400 as shown in FIG. 4 or part of system 400. A sensor may include, for example, a smoke detector, a carbon monoxide detector, a camera, a moisture sensor, a door sensor, a window sensor, a motion detector, a laser sensor, a door lock sensor, a window lock sensor, etc.

In some cases, receiving sensor data includes receiving sensor data from at least one of a smoke detector, a carbon monoxide detector, a camera, a moisture sensor, a magnetic door sensor, a magnetic window sensor, a motion detector, a laser break beam sensor, an infrared light break beam sensor, a smart door lock, a smart window lock, a light sensor, a visible light camera, an infrared light camera, or a temperature sensor. For example, with respect to FIG. 1A, the security monitoring system 108 can receive data from the smoke detector 112A (e.g., a notification indicating that smoke has been detected), image data from the camera 110A (e.g., that can show that the couch 120 is on fire), data from the motion detector 116A (e.g., a notification indicating that movement has been detected), etc.

In some cases, receiving sensor data includes receiving sensor data indicating at least one of a presence of smoke in the property, a presence of carbon monoxide in the property, an interior temperature of the property, a presence of moisture in the property, a door of the property is open, a door of the property is unlocked, a door of the property is locked, a window of the property is open, a window of the property is unlocked, a window of the property is locked, presence of light in the property, absence of light in the property, one or more persons in the property, one or more persons outside the property, one or more persons in a pool outside the property, one or more children in the property, one or more children outside the property, one or more children in a pool outside the property, one or more animals in the property, one or more animals outside the property, or one or more animals in a pool outside the property. For example, with respect to FIG. 1A, the security monitoring system 108 can receive data from the smoke detector 112A indicating that smoke has been detected on the first floor 130 of the house 102 (e.g., smoke caused by the fire 134). Similarly, the security monitoring system 108 can receive image data from the cameras 110A-110B indicating the presence of the fire 134 on the first floor 130, and/or that the fire 134 has yet to reach the second floor 132.

Based on the sensor data, a computer system determines an event that is occurring at the property (304). The event may include a fire, presence of carbon monoxide, other emergency situations, a particular temperature, a rate at which a temperature is changing, a broken (or open) window, a broken (or open) door, the presence of water, a water leak, extreme weather, a break-in or attempted break-in, high-occupancy, vacancy, a temperature of an asset, another risk of damage to an asset, a fall by an occupant, a time corresponding with a maintenance or work order, the presence of light, absence of light, activity within a pool, a pet chewing on a piece of furniture, etc.

In some cases, determining an event that is occurring at the property includes determining at least one of that a fire has started in the property, dangerous levels of carbon monoxide are present in the property, a threshold interior temperature of the property is met, a threshold rate of change of the property's interior temperature is met, a door of the property has been opened, a door of the property has been forcibly opened, a window of the property has been opened, a window of the property has been broken, a window of the property has been forcibly opened, moisture is present in the property, flooding is occurring at the property, severe weather conditions in an area where the property is located, an asset in the property has been damaged, an asset in the property has a sufficiently high likelihood of being damaged, high-occupancy in the property, an approximate temperature of an asset meets a threshold temperature, an approximate rate of change in an asset's temperature meets a threshold rate of temperature change, a person in the property has fallen, a current time corresponds to a scheduled time of a maintenance or work order, an asset is in direct sunlight, a child is approaching stairs of the property, a child is approaching a pool outside the property, a child has fallen into a pool outside the property, an animal has fallen into a pool outside the property, an animal is damaging an asset in the property, an animal is attacking a person in the property, or an animal is attacking a person outside the property.

Based on the event that is occurring at the property, the computer system determines a configuration for furniture located at the property (306). As an example, if a motion sensor detects the presence of occupants in a pool, the computer system may determine a new position for motorized furniture near the pool. The new position may be farther away from the pool if assets, such as electronics, are located on the furniture. The new position may be closer to the pool if assets, such as towels, are located on the furniture. Determining a configuration may include determining a current position and/or orientation of the furniture, a final position for the furniture, and, in some implementations, a path for the furniture to take to reach its final position. Determining a configuration may include determining a transformation or other alteration to the furniture itself. For example, determining a configuration may include determining that a piece of furniture having motorized doors should open the doors. As another example, determining a configuration may include determining that a piece of furniture having a bed within it should extend the bed, allowing an occupant to use the bed. Various configurations are possible, including, for example, consolidating the furniture, moving the furniture to block windows and/or doors, moving the furniture away heating or cooling elements, moving the furniture away from water or fire, moving the furniture to move, hide, or protect assets, etc.

In some cases, determining a configuration for furniture located at the property comprises determining a position for the furniture such that the furniture is to be moved to a position that provides one or more persons in the property a clear path to one or more exits of the property. For example, if the security monitoring system 108 shown in FIGS. 1A-1B determines that the event occurring at the house 102 involves an emergency, then the security monitoring system 108 can determine that the furniture such as the couch 120 and the coffee table 122 should be moved to a position that provides one or more persons in the property a clear path, such as the path 150, to the front door 128 of the house 102. An event corresponding to an emergency can include, for example, a fire in the house 102, flooding of the house 102, severe weather or a seismic event in an area in which the house 102 is located (e.g., earthquake, flooding, etc.), an injury or potential injury to a person in the house 102 (e.g., in order to better allow emergency service personnel to travel into the house 102, and/or to carry the person out of the house 102) such as person falling or becoming unresponsive, a person being attacked in the house 102 (e.g., by an animal or another person), a person having broken into the house 102, etc.

In some cases, determining a configuration for furniture located at the property comprises determining a position for the furniture such that the furniture is to be moved adjacent to one or more walls of the property. For example, if the security monitoring system 108 shown in FIGS. 1A-1B determines that the event occurring at the house 102 involves an emergency, then the security monitoring system 108 can determine that the couch 120 and the coffee table 122 should be moved adjacent to one or more walls of the house 102. Moving the couch 120 and the coffee table 122 to a position adjacent to one or more walls of the property can help to remove obstacles that might prevent or delay one or more persons from exiting the house 102, can help to create a clear path for one or more persons in the house 102 to an exit of the house 102 (e.g., the front door 128), and/or can help to reduce damage caused by the emergency. As an example, the security monitoring system 108 can determine to move the coffee table 122 to a position adjacent to one or more walls and/or away from the couch 120 to help prevent the coffee table 122 from catching fire. If the security monitoring system 108 determines that the couch 120 is on fire, the security monitoring system 108 may determine not to move the couch against one or more walls of the house 102 in an effort to slow or prevent the spread of the fire 134. Instead, the security monitoring system 108 may attempt to determine a position for the couch 120 that is away from one or more walls of the house 102, that is away from one or more other pieces of furniture, and/or does not block a path for one or more persons in the house 102 to an exit of the house 102.

An event corresponding to an emergency can include, for example, a fire in the house 102, flooding of the house 102, severe weather or a seismic event in an area in which the house 102 is located (e.g., earthquake, flooding, etc.), an injury or potential injury to a person in the house 102 (e.g., in order to better allow emergency service personnel to travel into the house 102, and/or to carry the person out of the house 102) such as person falling or becoming unresponsive, a person being attacked in the house 102 (e.g., by an animal or another person), a person having broken into the house 102, etc.

In some cases, determining a configuration for furniture located at the property comprises determining a position for the furniture such that the furniture is to be moved away from a door of the property. For example, if the security monitoring system 108 shown in FIGS. 1A-1B determines that the event occurring at the house 102 involves an emergency, then the security monitoring system 108 can determine that the couch 120 should be moved away from the front door 128 of the house 102. Moving the couch 120 to a position away from the front door 128 of the house 102 can help to remove an obstacle that might prevent or delay one or more persons from exiting the house 102, and/or can help to create a clear path for one or more persons in the house 102 to an exit of the house 102, e.g., the front door 128. An event corresponding to an emergency can include, for example, a fire in the house 102, flooding of the house 102, severe weather or a seismic event in an area in which the house 102 is located (e.g., earthquake, flooding, etc.), an injury or potential injury to a person in the house 102 (e.g., in order to better allow emergency service personnel to travel into the house 102, and/or to carry the person out of the house 102) such as person falling or becoming unresponsive, a person being attacked in the house 102 (e.g., by an animal or another person), a person having broken into the house 102, etc.

In some cases, determining a configuration for furniture located at the property comprises determining a position for the furniture such that the furniture is to be moved away from a window of the property. For example, if the security monitoring system 108 shown in FIGS. 1A-1B determines that the event occurring at the house 102 involves an emergency, then the security monitoring system 108 can determine that the kitchen table 124 should be moved away from a window of the house 102. Moving the kitchen table 124 to a position away from the window of the house 102 can help to remove an obstacle that might prevent or delay one or more persons from exiting the house 102, and/or can help to create a clear path for one or more persons in the house 102 to an exit of the house 102, e.g., the window. An event corresponding to an emergency can include, for example, a fire in the house 102, flooding of the house 102, severe weather or a seismic event in an area in which the house 102 is located (e.g., earthquake, flooding, etc.), an injury or potential injury to a person in the house 102 (e.g., in order to better allow emergency service personnel to travel into the house 102, and/or to carry the person out of the house 102) such as person falling or becoming unresponsive, a person being attacked in the house 102 (e.g., by an animal or another person), a person having broken into the house 102, etc.

In some cases, determining a configuration for furniture located at the property comprises determining a position for the furniture such that the furniture is to be moved in front of a window or door of the property. For example, with respect to FIG. 2B, if the security monitoring system 108 determines that the event occurring at the house 102 is a break-in or a potential break-in (e.g., determined from data provided by the window sensor 216 that indicates a break to the window 214), then the security monitoring system 108 can determine that the couch 212 should be moved in front of the broken window 214 in an effort to protect the occupants of the house 102, e.g., in an effort to prevent or delay the break-in. Similarly, if the security monitoring system 108 determines that the event occurring at the house 102 is severe weather in an area in which the house 102 is located (e.g., determined from data provided by the window sensor 216 that indicates a break to the window 214, and/or from weather data obtained from one or more external systems), then the security monitoring system 108 can determine that the couch 212 should be moved in front of the broken window 214 in an effort to protect the occupants of the house 102 from the severe weather.

In some cases, determining a configuration for furniture located at the property comprises determining a position for the furniture such that the furniture is to be moved away from one or more animals in the property. For example, if the security monitoring system 108 shown in FIGS. 1A-1B determines that the a piece of furniture is being damaged by a pet in the house 102, the security monitoring system 108 can determine a new position for the piece of furniture in order to move it away from the pet, e.g., to a location that the pet cannot get to or a location that the pet is known to not visit. Similarly, in some implementations, if the security monitoring system 108 shown in FIGS. 1A-1B determines that the a piece of furniture is being damaged by a pet in the house 102, the security monitoring system 108 can determine to move the piece of furniture in an effort to dissuade the pet from continuing to damage the piece of furniture. For example, the security monitoring system 108 can determine to move the piece of furniture in a direction towards the pet.

In some cases, determining a configuration for furniture located at the property comprises determining a position for the furniture such that the furniture is to be moved away from one or more animals in the property. For example, if the security monitoring system 108 shown in FIGS. 1A-1B determines that the a piece of furniture, or that an asset placed on (or located in) the piece of furniture, is being damaged by a pet in the house 102, the security monitoring system 108 can determine a new position for the piece of furniture in order to move it away from the pet, e.g., to a location that the pet cannot get to or a location that the pet is known to not visit. The security monitoring system 108, can for example, determine to move a piece of furniture away from an animal upon determining that the furniture is being damaged (e.g., using image data provided by the cameras 110A-110B), upon determining that a likelihood of the furniture being damaged meets a threshold likelihood (e.g., 70%, 75%, 80%, etc.), upon determining that an asset placed on (or located in) the furniture is being damaged, or upon determining that a likelihood of an asset placed on (or located in) the furniture being damaged meets a threshold likelihood (e.g., 70%, 75%, 80%, etc.).

Similarly, in some implementations, if the security monitoring system 108 shown in FIGS. 1A-1B determines that the a piece of furniture is being damaged by a pet in the house 102, the security monitoring system 108 can determine to move the piece of furniture in an effort to dissuade the pet from continuing to damage the piece of furniture. For example, the security monitoring system 108 can determine to move the piece of furniture in a direction towards the pet. The security monitoring system 108, can for example, determine to move a piece of furniture (e.g., towards an animal) upon determining that the furniture is being damaged (e.g., using image data provided by the cameras 110A-110B), upon determining that a likelihood of the furniture being damaged meets a threshold likelihood (e.g., 70%, 75%, 80%, etc.), upon determining that an asset placed on (or located in) the furniture is being damaged, or upon determining that a likelihood of an asset placed on (or located in) the furniture being damaged meets a threshold likelihood (e.g., 70%, 75%, 80%, etc.).

In some cases, determining a configuration for furniture located at the property comprises determining a position for the furniture such that the furniture is to be moved away from a pool outside the property. For example, if the security monitoring system 108 shown in FIGS. 1A-1B determines that the a piece of furniture, or that an asset placed on (or located in) the piece of furniture, has a sufficient likelihood of suffering water damage from one or more persons in a pool located at the house, the security monitoring system 108 can determine a new position for the piece of furniture in order to move it away from the pool, e.g., to a location that the furniture and/or the asset is unlikely to suffer water damage. The security monitoring system 108 can, for example, select a position for the furniture that is sufficiently far from the pool such that the likelihood of the furniture and/or the asset suffering water damage from splashes at the position is below a particular threshold (e.g., below 2%, 5%, 10%, etc.). The security monitoring system 108, can for example, determine to move a piece of furniture away from a pool upon determining that the furniture is being damaged (e.g., using image data provided by one or more cameras that can capture images of an area in which the pool is located or adjacent to), upon determining that a likelihood of the furniture being damaged meets a threshold likelihood (e.g., 50%, 55%, 60%, etc.), upon determining that an asset placed on (or located in) the furniture is being damaged, or upon determining that a likelihood of an asset placed on (or located in) the furniture being damaged meets a threshold likelihood (e.g., 50%, 55%, 60%, etc.).

In some cases, determining a configuration for furniture located at the property comprises determining a position for the furniture such that the furniture is to be moved away from an open or broken window of the property. For example, if the security monitoring system 108 shown in FIGS. 1A-1B determines that the a piece of furniture, or that an asset placed on (or located in) the piece of furniture, is likely to be damaged from moisture coming through an open or broken window of the house 102, the security monitoring system 108 can determine a new position for the piece of furniture in order to move it away from the open or broken window. The security monitoring system 108, can for example, determine to move a piece of furniture away from an open or broken window upon determining that the furniture is being damaged (e.g., using one or more of image data provided by cameras, a window sensor, weather data from one or more external systems, a moisture sensor, etc.), upon determining that a likelihood of the furniture being damaged meets a threshold likelihood (e.g., 70%, 75%, 80%, etc.), upon determining that an asset placed on (or located in) the furniture is being damaged, or upon determining that a likelihood of an asset placed on (or located in) the furniture being damaged meets a threshold likelihood (e.g., 70%, 75%, 80%, etc.). The determination can be based on part on weather data, e.g., that the security monitoring system 108 determines using one or more sensors, and/or receives from one or more external systems.

In some cases, determining a configuration for furniture located at the property comprises determining a position for the furniture such that the furniture is to be moved away from an open (or broken) door of the property. For example, if the security monitoring system 108 shown in FIGS. 1A-1B determines that the a piece of furniture, or that an asset placed on (or located in) the piece of furniture, is likely to be damaged from moisture coming through the open front door 128 of the house 102, the security monitoring system 108 can determine a new position for the piece of furniture in order to move it away from the open front door 128. The security monitoring system 108, can for example, determine to move a piece of furniture away from an open (or broken) door upon determining that the furniture is being damaged (e.g., using one or more of image data provided by cameras, a window sensor, weather data from one or more external systems, a moisture sensor, etc.), upon determining that a likelihood of the furniture being damaged meets a threshold likelihood (e.g., 70%, 75%, 80%, etc.), upon determining that an asset placed on (or located in) the furniture is being damaged, or upon determining that a likelihood of an asset placed on (or located in) the furniture being damaged meets a threshold likelihood (e.g., 70%, 75%, 80%, etc.). The determination can be based on part on weather data, e.g., that the security monitoring system 108 determines using one or more sensors, and/or receives from one or more external systems.

In some cases, determining a configuration for furniture located at the property comprises determining a position for the furniture such that the furniture is to be moved away from direct sunlight. For example, with respect to FIG. 2C, if the security monitoring system 108 determines that the table 222 and/or the laptop 228 is in direct sunlight coming through the window 224 (e.g., using image data from the camera 226 and/or weather data from one or more external systems), the security monitoring system 108 can determine a new position for the table 222 in order to move it out of direct sunlight and/or in order to move the laptop 228 out of direct sunlight. The security monitoring system 108, can for example, determine to move a piece of furniture away from direct sunlight upon determining that the furniture is being damaged (e.g., using one or more of image data provided by cameras, weather data from one or more external systems, a thermometer, a light sensor, etc.), upon determining that a likelihood of the furniture being damaged meets a threshold likelihood (e.g., 70%, 75%, 80%, etc.), upon determining that an asset placed on (or located in) the furniture is being damaged, or upon determining that a likelihood of an asset placed on (or located in) the furniture being damaged meets a threshold likelihood (e.g., 70%, 75%, 80%, etc.). The determination can be based on part on weather data, e.g., that the security monitoring system 108 determines using one or more sensors, and/or receives from one or more external systems.

In some cases, determining a configuration for furniture located at the property comprises determining a position for the furniture such that the furniture is to be moved away from moisture. For example, with respect to FIG. 2D, if the security monitoring system 108 determines that the table 232 is exposed to moisture (e.g., to the water 242), the security monitoring system 108 can determine a new position for the table 232 in order to move it away from the moisture. For example, the security monitoring system 108 can provide instructions for the table 232 to be moved away from the water 242 using motorized wheels. As another example, as shown in FIG. 2D, the security monitoring system 108 can provide instructions for the table 232 to be raised off the ground away from the water 242. The security monitoring system 108, can for example, determine to move a piece of furniture away from moisture upon determining that the furniture is being damaged (e.g., using one or more of image data provided by cameras, weather data from one or more external systems, a moisture sensor, etc.), upon determining that a likelihood of the furniture being damaged meets a threshold likelihood (e.g., 70%, 75%, 80%, etc.), upon determining that an asset placed on (or located in) the furniture is being damaged, or upon determining that a likelihood of an asset placed on (or located in) the furniture being damaged meets a threshold likelihood (e.g., 70%, 75%, 80%, etc.). The determination can be based on part on weather data, e.g., that the security monitoring system 108 determines using one or more sensors, and/or receives from one or more external systems.

In some cases, determining a configuration for furniture located at the property comprises determining a position for the furniture such that the furniture is to be moved away from a fire in the property. For example, with respect to FIGS. 1A-1B, if the security monitoring system 108 determines that the coffee table 122 is near the fire 134, the security monitoring system 108 can determine a new position for the coffee table 122 in order to move it away from the fire 134 in an effort to prevent or delay the spread of the fire 134, e.g., to prevent or delay the coffee table 122 catching fire. The security monitoring system 108, can for example, determine to move a piece of furniture away from a fire upon determining that the furniture is being damaged (e.g., using one or more of image data provided by cameras, a thermometer, a smoke detector, a motion detector, etc.), upon determining that a likelihood of the furniture being damaged meets a threshold likelihood (e.g., 40%, 45%, 50%, etc.), upon determining that an asset placed on (or located in) the furniture is being damaged, or upon determining that a likelihood of an asset placed on (or located in) the furniture being damaged meets a threshold likelihood (e.g., 40%, 45%, 50%, etc.). The determination can be based on part on weather data, e.g., that the security monitoring system 108 determines using one or more sensors, and/or receives from one or more external systems.

In some cases, determining a configuration for furniture located at the property comprises determining a position for the furniture such that the furniture is to be moved away from a heating element and/or a cooling element of the property. For example, with respect to FIG. 2A, if the security monitoring system 108 determines that the couch 202 is blocking a vent 208 and the heat or AC has been turned on, the security monitoring system 108 can determine a new position for the couch 202 in order to move it away from the vent 208. The security monitoring system 108, can for example, determine to move a piece of furniture away from a heating element and/or a cooling element upon determining that the furniture is being damaged (e.g., using one or more of image data provided by cameras, a thermometer, a thermostat, a smart HVAC unit, a smoke detector, etc.), upon determining that a likelihood of the furniture being damaged meets a threshold likelihood (e.g., 40%, 45%, 50%, etc.), upon determining that an asset placed on (or located in) the furniture is being damaged, or upon determining that a likelihood of an asset placed on (or located in) the furniture being damaged meets a threshold likelihood (e.g., 40%, 45%, 50%, etc.).

Alternatively, the security monitoring system 108, can for example, determine to move a piece of furniture away from a heating element and/or a cooling element upon determining that the heating element and/or cooling element has been turned on (e.g., from data provided by the thermostat 206 shown in FIG. 2A), upon determining that a rate of temperature increase meets a threshold rate (e.g., indicating that the room 210 is not heating fast enough when the heat is turned on, or indicating that the room 210 is continuing to heat despite the AC being turned on), upon determining that a rate of temperature decrease meets a threshold rate (e.g., indicating that the room 210 is not cooling fast enough when the AC is turned on, or indicating that the room 210 is continuing to cool despite the heat being turned on), or upon determining that temperature of the property meets a threshold temperature (e.g., indicating that the heat is about to be turned on, or indicating that the AC is about to be turned on). Moving the couch 202 away from the vent 208 can help to improve the thermal efficiency of the house 102, prevent the couch 202 from being damaged (e.g., due to heat), allow the room 210 to heat up or cool down quicker, etc.

In some cases, determining a configuration for furniture located at the property comprises determining a position for the furniture such that the furniture is to be moved to a position in front of a window of the property that is allowing sunlight to enter the property. For example, with respect to FIG. 2A, if the security monitoring system 108 determines that sunlight is coming through the window 204 and/or that a temperature in the room 210 has reached a threshold temperature (e.g., indicating a high heat), the security monitoring system 108 can determine a new position for the couch 202 in order to move it in front of the window 204 to prevent or reduce sunlight entering the room 210 through the window 204, e.g., in an effort to reduce the temperature of the room 210. The security monitoring system 108, can for example, determine to move a piece of furniture to a position in front of a window of the property that is allowing sunlight to enter the property upon determining that a rate of temperature increase meets a threshold rate (e.g., indicating that the room 210 heating up too fast, or indicating that the room 210 is continuing to heat despite the AC being turned on), upon determining that a rate of temperature decrease meets a threshold rate (e.g., indicating that the room 210 is not cooling fast enough when the AC is turned on), or upon determining that temperature of the property meets a threshold temperature (e.g., indicating that the room 210 is too hot).

In some cases, determining a configuration for furniture located at the property comprises determining a position for the furniture such that the furniture is to be moved to a position away from a window of the property to allow additional sunlight to enter the property. For example, with respect to FIG. 2A, if the security monitoring system 108 determines the room 210 is too cold (or is cooling to quickly) and that the couch 202 is preventing sunlight from entering the room 210 by blocking or partially blocking the window 204 (e.g., as determined from one or more of images from a camera, a light sensor, weather data from one or more systems indicating that it is sunny or partially sunning, a clock indicating that it is daytime, etc.), the security monitoring system 108 can determine a new position for the couch 202 in order to move it away from the window 204 to allow sunlight to enter the room 210 or allow more sunlight to enter the room 210, e.g., in an effort to increase the temperature of the room 210. The security monitoring system 108, can for example, determine to move a piece of furniture to a position away from a window of the property to allow additional sunlight to enter the property upon determining that a rate of temperature increase meets a threshold rate (e.g., indicating that the room 210 heating up too slow), upon determining that a rate of temperature decrease meets a threshold rate (e.g., indicating that the room 210 is cooling down too fast, or indicating that the room 210 is cooling down despite the heat being turned on), or upon determining that temperature of the property meets a threshold temperature (e.g., indicating that the room 210 is too cold).

In some cases, determining a configuration for furniture located at the property comprises determining a position for the furniture such that the furniture is to be moved to a position in front of a window of the property that is open or broken. For example, with respect to FIG. 2A, if the security monitoring system 108 determines that window 204 is open and that the room 210 is too cold or too hot, the security monitoring system 108 can determine a new position for the couch 202 in order to move it in front of the window 204 to reduce heat loss (e.g., if the outside temperature is lower than the temperature inside the room 210) or to reduce the heat gain (e.g., if the outside temperature is greater than the temperature inside the room 210). The security monitoring system 108, can for example, determine to move a piece of furniture to a position in front of a window of the property that is open or broken upon determining that a heating unit of the property has been turned on, upon determining that a cooling unit of the property has been turned on, upon determining that a rate of temperature increase meets a threshold rate (e.g., indicating that the room 210 heating up too fast, or indicating that the room 210 is continuing to heat despite the AC being turned on when the outside temperature is higher than the temperature of the room 210; e.g., indicating that the room 210 is heating up too slow when the outside temperature is lower than the temperature of the room 210), upon determining that a rate of temperature decrease meets a threshold rate (e.g., indicating that the room 210 is cooling down too fast, or indicating that the room 210 is continuing to cool despite the heat being turned on when the outside temperature is lower than the temperature of the room 210; e.g., indicating that the room 210 is cooling down too slow when the outside temperature is higher than the temperature of the room 210), or upon determining that temperature of the property meets a threshold temperature (e.g., indicating that the room 210 is too hot, or indicating that the room 210 is too cold).

In some cases, determining a configuration for furniture located at the property comprises determining a position for the furniture such that the furniture is to be moved to a position away from a window of the property that is open or broken. For example, with respect to FIG. 2A, if the security monitoring system 108 determines that window 204 is open but is being blocked (or partially blocked) by the couch 202 and that the room 210 is too cold or too hot, the security monitoring system 108 can determine a new position for the couch 202 in order to move it away of the window 204, e.g., in an effort to encourage heat loss (e.g., if the outside temperature is lower than the temperature inside the room 210) or to encourage heat gain (e.g., if the outside temperature is greater than the temperature inside the room 210). The security monitoring system 108, can for example, determine to move a piece of furniture to a position away from a window of the property that is open or broken upon determining that a heating unit of the property has been turned off, upon determining that a cooling unit of the property has been turned off, upon determining that a rate of temperature increase meets a threshold rate (e.g., indicating that the room 210 heating up too fast, or indicating that the room 210 is continuing to heat despite the AC being turned on when the outside temperature is lower than the temperature of the room 210; e.g., indicating that the room 210 is heating up too slow when the outside temperature is higher than the temperature of the room 210), upon determining that a rate of temperature decrease meets a threshold rate (e.g., indicating that the room 210 is cooling down too fast, or indicating that the room 210 is continuing to cool despite the heat being turned on when the outside temperature is higher than the temperature of the room 210; e.g., indicating that the room 210 is cooling down too slow when the outside temperature is lower than the temperature of the room 210), or upon determining that temperature of the property meets a threshold temperature (e.g., indicating that the room 210 is too hot, or indicating that the room 210 is too cold).

In some cases, determining a configuration for furniture located at the property comprises determining a position for the furniture such that the furniture is to be moved to a position adjacent to a person in the property. For example, with respect to FIGS. 1A-1B, if the security monitoring system 108 determines that an occupant of the house 102 has fallen, the security monitoring system 108 can determine a new position for the coffee table 122 in order to bring it closer to the occupant (i) to provide them an object that they can use to help themselves up, or (ii) to bring the person an asset that is placed on (or located in) the coffee table 122, e.g., as cell phone which the person can use to call emergency services. The security monitoring system 108, can for example, determine to move a piece of furniture to a position adjacent to a person in the property upon determining that the person requires assistance (e.g., person has hurt themselves), and/or upon determining that the piece of furniture or an asset on (or in) the piece of furniture can assist the person that requires assistance (e.g., the furniture can be used for leverage, a phone or laptop is placed on the furniture that can be used to contact other people or emergency services, etc.).

In some cases, determining a configuration for furniture located at the property comprises determining a position for the furniture such that the furniture is to be moved to a position closer to a pool of the property. For example, with respect to FIGS. 1A-1B, if the security monitoring system 108 determines that a person in a pool at the house 102 is in the process of getting out of the pool, the security monitoring system 108 can determine a new position for an outdoor chair in order to bring a towel on the outdoor chair closer to the person. The security monitoring system 108, can for example, determine to move a piece of furniture to a position closer to a pool of the property upon determining that a person requires assistance (e.g., person has hurt themselves), and/or upon determining that the piece of furniture or an asset on (or in) the piece of furniture can assist the person that requires assistance (e.g., the furniture can be used for leverage, a phone or laptop is placed on the furniture that can be used to contact other people or emergency services, etc.).

In some cases, determining a configuration for furniture located at the property comprises determining a position for the furniture such that the furniture is to be moved to a position away from one or more persons in the property. For example, with respect to FIGS. 1A-1B, if the security monitoring system 108 determines that the occupancy of the house 102 is greater than a threshold occupancy (e.g., five persons, ten persons, twelve persons, etc.), the security monitoring system 108 can determine that the couch 120, the coffee table 122, and the kitchen table 124 should be moved to position that is away from the persons in the house 102, e.g., in order to open up space for the people in the house 102. The security monitoring system 108 can use, for example, the cameras 110A-110B, the motion detectors 116A-116B, and/or the door sensor 114 to determine the occupancy of the house 102.

Similarly, in some cases, determining a configuration for furniture located at the property comprises determining a position for the furniture such that the furniture is to be moved adjacent to one or more walls of the property. For example, with respect to FIGS. 1A-1B, if the security monitoring system 108 determines that the occupancy of the house 102 is greater than a threshold occupancy (e.g., five persons, ten persons, twelve persons, etc.), the security monitoring system 108 can determine that the couch 120, the coffee table 122, and the kitchen table 124 should be moved to position that is adjacent to one or more walls of the house 102, e.g., in order to open up space for the people in the house 102. The security monitoring system 108 can use, for example, the cameras 110A-110B, the motion detectors 116A-116B, and/or the door sensor 114 to determine the occupancy of the house 102.

In some cases, determining a configuration for furniture located at the property comprises determining to close one or more motorized components of the furniture. For example, with respect to FIGS. 1A-1B, if the security monitoring system 108 determines that a break-in is occurring or that there is a sufficient likelihood of a break-in occurring, the security monitoring system 108 can determine to close a motorize drawer of the coffee table 122, e.g., in an effort to prevent theft of one or more assets in the motorized drawer of the coffee table 122. The security monitoring system 108, can for example, determine to close one or more motorized components of the furniture upon determining that a break-in is occurring at the property (e.g., in an effort to prevent theft or damage to one or more assets located in the property), a likelihood of a break-in occurring at the property meets a threshold likelihood (e.g., in an effort to prevent damage to one or more assets located in the property), an area in which the property is located is experiencing severe weather (e.g., in an effort to prevent damage to one or more assets located in the property), or a current time corresponds to a scheduled arrival time of a visitor at the property (e.g., in an effort to prevent damage or theft to one or more assets located in the property).

In some cases, determining a configuration for furniture located at the property comprises determining to lock one or more locking mechanisms of the furniture. For example, with respect to FIGS. 1A-1B, if the security monitoring system 108 determines that a break-in is occurring or that there is a sufficient likelihood of a break-in occurring, the security monitoring system 108 can determine to lock a drawer of the coffee table 122, e.g., in an effort to prevent theft of one or more assets in the motorized drawer of the coffee table 122. The security monitoring system 108, can for example, determine to lock one or more locking mechanisms (e.g., Wi-Fi or Bluetooth enabled smart locks) of the furniture upon determining that a break-in is occurring at the property (e.g., in an effort to prevent theft or damage to one or more assets located in the property), a likelihood of a break-in occurring at the property meets a threshold likelihood (e.g., in an effort to prevent damage to one or more assets located in the property), an area in which the property is located is experiencing severe weather (e.g., in an effort to prevent damage to one or more assets located in the property), or a current time corresponds to a scheduled arrival time of a visitor at the property (e.g., in an effort to prevent damage or theft to one or more assets located in the property).

In some cases, determining a configuration for furniture located at the property comprises determining to raise the furniture. For example, with respect to FIG. 2D, if the security monitoring system 108 determines that the table 232 is being damaged due to being exposed to the water 242 or is sufficiently likely to be damaged due to being exposed to the water 242, the security monitoring system 108 can determine to raise the table 232 off the ground using the cables 236A-236D. The security monitoring system 108, can for example, determine to raise the furniture upon determining that an emergency is occurring at the property (e.g., flooding, fire, etc.), an occupancy of the property or a room of the property has met a threshold occupancy (e.g., five people in the room 240, seven people in the room 240, ten people in the room 240, etc.), a current time is within a time period (e.g., the security monitoring system 108 has been programed by an occupant of the house 102 to have the table 232 raised during the time period such as the period between the end of dinner on a first day and the expected start to breakfast the next day), the furniture or an asset placed on the furniture is in direct sunlight, or the furniture or an asset placed on the furniture is adjacent an open or broken window (e.g., the table 232 is shown in FIG. 2D as adjacent to the open window 234).

In some cases, determining a configuration for furniture located at the property comprises determining to extend or compress the furniture. For example, with respect to FIGS. 1A-1B, if the security monitoring system 108 determines that the current time falls within a scheduled rest time, the security monitoring system 108 can extend the bed 126 from a compact arrangement (e.g., to open up space in the second floor 132) to an extended arrangement (e.g., to allow for sleeping). The security monitoring system 108, can for example, determine to extend or compress the furniture upon determining an occupancy of the property or a room of the property has met a threshold occupancy (e.g., compress the bed 126 if there are more than five people on the second floor 132, more than seven people on the second floor 132, more than ten people on the second floor 132, etc.), a current time is within a time period (e.g., the security monitoring system 108 has been programed by an occupant of the house 102 to have the bed extended between 10:00 pm and 7:00 am), one or more persons at the property need assistance (e.g., the bed 126 can be extended to provide a person who has fallen leverage to get up), a break-in is occurring at the property (e.g., can compress a piece of furniture in an effort to hide one or more assets in the furniture), the likelihood of a break-in meets a threshold likelihood, or an emergency is occurring at the property (e.g., can compress a piece of furniture to keep move a portion of the furniture away from a fire, can compress a piece of furniture to make it more difficult for the furniture to catch fire, etc.).

In some cases, determining the configuration for the furniture located at the property includes determining a current position of the furniture, and determining a final position for the furniture. For example, with respect to FIGS. 1A-1B, the security monitoring system 108 can use the cameras 110A-110B to identify current positions for the furniture in the house 102. The security monitoring system 108 can use the current positions and, for example, a known layout of the house 102 to determine final positions for the furniture in the house 102, e.g., the position 140 for the couch 120, the position 142 for the coffee table 122, and the position 144 for the kitchen table 124.

The final layout (e.g., that includes one or more final positions for one or more pieces of furniture) for the furniture can be determined based on the one or more events that are determined to be occurring at the property. As an example, the security monitoring system 108 can refer to a lookup table. The lookup table can associate different events or combinations of events with different furniture layouts. For example, with respect to FIGS. 1A-1B, the lookup table can include a first final layout for the coffee table 122, the couch 120, and/or the kitchen table 124 for the first floor 130 when a fire is detected on the first floor 130. The first final layout can include, for example, the position 140 for the couch 120, the position 142 for the coffee table 122, and the position 144 for the kitchen table 124. Similarly, the lookup table can include a second final layout for the coffee table 122, the couch 120, and/or the kitchen table 124 for the first floor 130 when a different event is detected as occurring, e.g., a flood, a break-in, severe weather, an occupant needs assistance, etc. For example, the second final layout can have the couch 120 moved up against the front door 128 when a break-in is detected by the security monitoring system 108.

The lookup table can also include one or more default layouts. For example, the current position of the couch 120, the coffee table 122, and the kitchen table 124 shown in FIG. 1A can correspond to a default layout. The security monitoring system 108 can revert to the one or more default layouts after it determines that an event has ended, after it receives instructions from an occupant of the house 102 that the event has ended, after it receives instructions from an occupant of the house 102 that the furniture should be moved back to the default layout, etc. The lookup table can include multiple lookup tables depending on the time of day, e.g., that correspond to one or more programmed time periods. For example, the security monitoring system 108 can be programmed such that the kitchen table is in the position 144 between the times of 10:00 pm to 7:00 μm, and can be in the current position shown in FIG. 1A between the times of 7:01 pm and 9:59 pm (e.g., for dinner).

In some cases, determining the configuration for the furniture located at the property includes determining a path for the furniture to travel from the current position to the final position. For example, in determining how to move the couch 120 from its current position to the position 140, the security monitoring system 108 can identify a path that avoids obstacles such as other pieces of furniture, persons in the house 102, and/or animals in the house 102.

As an example, the security monitoring system 108 shown in FIGS. 1A-1B, can use a lookup table (e.g., such as the lookup table that indicates one or more final layouts and/or default layouts as described above). The lookup table can indicate, for example, one or more paths for furniture to move from a current or default position to a final position. The lookup table can indicate an order to how the pieces of furniture will be moved. In some implementations, two or more pieces of furniture can be moved at the same time (e.g., if their respective paths would not lead to the pieces of furniture contacting one another). For example, with respect to FIGS. 1A-1B, the security monitoring system 108 can use the lookup table to determine a path for the couch 120 to move to the position 140, a path for the coffee table 122 to move to the position 142, and a path for the kitchen table 124 to move to the position 144. The security monitoring system 108 can determine, e.g., using the lookup table, that the couch 120 and the kitchen table 124 can both be moved to their respective positions first (e.g., due to there being no or little risk of the couch 120 and the kitchen table 124 contacting one another as they move to the positions 140 and 144 respectively). After the couch 120 reaches the position 140 or has made sufficient progress towards the position 140, e.g., has travelled a threshold distance or distance that corresponds to a threshold percentage of the length of the path for the couch 120 (e.g., 50%, 60%, 70%, etc.), then the security monitoring system 108 can provide instructions to the coffee table 122 to start moving towards the position 142 along a path indicated by the lookup table.

The computer system provides, to the furniture, instructions to move into the configuration (308). These instructions may be provided over a network (e.g., network 405 as shown in FIG. 4). These instructions may include a final position for the furniture. These instructions may also include a path for the furniture to take in order to reach the final position.

FIG. 4 is a block diagram of an example security monitoring system 400. The system 400 includes a network 405, a control unit 410, one or more user devices 440 and 450, a monitoring server 460, and a central alarm station server 470. In some examples, the network 405 facilitates communications between the control unit 410, the one or more user devices 440 and 450, the monitoring server 460, and the central alarm station server 470.

In some implementations, the system 400 is the security monitoring system 108 as shown in FIGS. 1A-2D.

The network 405 is configured to enable exchange of electronic communications between devices connected to the network 405. For example, the network 405 may be configured to enable exchange of electronic communications between the control unit 410, the one or more user devices 440 and 450, the monitoring server 460, and the central alarm station server 470. The network 405 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 405 may include multiple networks or subnetworks, each of which may include, for example, a wired or wireless data pathway. The network 405 may include a circuit-switched network, a packet-switched data network, or any other network able to carry electronic communications (e.g., data or voice communications). For example, the network 405 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 405 may include one or more networks that include wireless data channels and wireless voice channels. The network 405 may be a wireless network, a broadband network, or a combination of networks including a wireless network and a broadband network.

The control unit 410 includes a controller 412 and a network module 414. The controller 412 is configured to control a control unit monitoring system (e.g., a control unit system) that includes the control unit 410. In some examples, the controller 412 may include a processor or other control circuitry configured to execute instructions of a program that controls operation of a control unit system. In these examples, the controller 412 may be configured to receive input from sensors, flow meters, or other devices included in the control unit system and control operations of devices included in the household (e.g., speakers, lights, doors, etc.). For example, the controller 412 may be configured to control operation of the network module 414 included in the control unit 410.

The network module 414 is a communication device configured to exchange communications over the network 405. The network module 414 may be a wireless communication module configured to exchange wireless communications over the network 405. For example, the network module 414 may be a wireless communication device configured to exchange communications over a wireless data channel and a wireless voice channel. In this example, the network module 414 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 414 also may be a wired communication module configured to exchange communications over the network 405 using a wired connection. For instance, the network module 414 may be a modem, a network interface card, or another type of network interface device. The network module 414 may be an Ethernet network card configured to enable the control unit 410 to communicate over a local area network and/or the Internet. The network module 414 also may be a voice band modem configured to enable the alarm panel to communicate over the telephone lines of Plain Old Telephone Systems (POTS).

The control unit system that includes the control unit 410 includes one or more sensors. For example, the monitoring system may include multiple sensors 420. The sensors 420 may include a lock sensor, a contact sensor, a motion sensor, or any other type of sensor included in a control unit system. The sensors 420 also may include an environmental sensor, such as a temperature sensor, a water sensor, a rain sensor, a wind sensor, a light sensor, a smoke detector, a carbon monoxide detector, an air quality sensor, etc. The sensors 420 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the sensors 420 may include a radio-frequency identification (RFID) sensor that identifies a particular article that includes a pre-assigned RFID tag.

The control unit 410 communicates with the module 422 and the camera 430 to perform monitoring. The module 422 is connected to one or more devices that enable home automation control. For instance, the module 422 may be connected to one or more lighting systems and may be configured to control operation of the one or more lighting systems. Also, the module 422 may be connected to one or more electronic locks at the property and may be configured to control operation of the one or more electronic locks (e.g., control Z-Wave locks using wireless communications in the Z-Wave protocol. Further, the module 422 may be connected to one or more appliances at the property and may be configured to control operation of the one or more appliances. The module 422 may include multiple modules that are each specific to the type of device being controlled in an automated manner. The module 422 may control the one or more devices based on commands received from the control unit 410. For instance, the module 422 may cause a lighting system to illuminate an area to provide a better image of the area when captured by a camera 430.

The camera 430 may be a video/photographic camera or other type of optical sensing device configured to capture images. For instance, the camera 430 may be configured to capture images of an area within a building or within a residential facility 102-A monitored by the control unit 410. The camera 430 may be configured to capture single, static images of the area and also video images of the area in which multiple images of the area are captured at a relatively high frequency (e.g., thirty images per second). The camera 430 may be controlled based on commands received from the control unit 410.

The camera 430 may be triggered by several different types of techniques. For instance, a Passive Infra-Red (PIR) motion sensor may be built into the camera 430 and used to trigger the camera 430 to capture one or more images when motion is detected. The camera 430 also may include a microwave motion sensor built into the camera and used to trigger the camera 430 to capture one or more images when motion is detected. The camera 430 may have a "normally open" or "normally closed" digital input that can trigger capture of one or more images when external sensors (e.g., the sensors 420, PIR, door/window, etc.) detect motion or other events. In some implementations, the camera 430 receives a command to capture an image when external devices detect motion or another potential alarm event. The camera 430 may receive the command from the controller 412 or directly from one of the sensors 420.

In some examples, the camera 430 triggers integrated or external illuminators (e.g., Infra-Red, Z-wave controlled "white" lights, lights controlled by the module 422, etc.) to improve image quality when the scene is dark. An integrated or separate light sensor may be used to determine if illumination is desired and may result in increased image quality.

The camera 430 may be programmed with any combination of time/day schedules, system "arming state", or other variables to determine whether images should be captured or not when triggers occur. The camera 430 may enter a low-power mode when not capturing images. In this case, the camera 430 may wake periodically to check for inbound messages from the controller 412. The camera 430 may be powered by internal, replaceable batteries if located remotely from the control unit 410. The camera 430 may employ a small solar cell to recharge the battery when light is available. Alternatively, the camera 430 may be powered by the controller 412's power supply if the camera 430 is colocated with the controller 412.

In some implementations, the camera 430 communicates directly with the monitoring server 460 over the Internet. In these implementations, image data captured by the camera 430 does not pass through the control unit 410 and the camera 430 receives commands related to operation from the monitoring server 460.

The system 400 also includes thermostat 434 to perform dynamic environmental control at the property. The thermostat 434 is configured to monitor temperature and/or energy consumption of an HVAC system associated with the thermostat 434, and is further configured to provide control of environmental (e.g., temperature) settings. In some implementations, the thermostat 434 can additionally or alternatively receive data relating to activity at a property and/or environmental data at a property, e.g., at various locations indoors and outdoors at the property. The thermostat 434 can directly measure energy consumption of the HVAC system associated with the thermostat, or can estimate energy consumption of the HVAC system associated with the thermostat 434, for example, based on detected usage of one or more components of the HVAC system associated with the thermostat 434. The thermostat 434 can communicate temperature and/or energy monitoring information to or from the control unit 410 and can control the environmental (e.g., temperature) settings based on commands received from the control unit 410.

In some implementations, the thermostat 434 is a dynamically programmable thermostat and can be integrated with the control unit 410. For example, the dynamically programmable thermostat 434 can include the control unit 410, e.g., as an internal component to the dynamically programmable thermostat 434. In addition, the control unit 410 can be a gateway device that communicates with the dynamically programmable thermostat 434.

A module 437 is connected to one or more components of an HVAC system associated with a property, and is configured to control operation of the one or more components of the HVAC system. In some implementations, the module 437 is also configured to monitor energy consumption of the HVAC system components, for example, by directly measuring the energy consumption of the HVAC system components or by estimating the energy usage of the one or more HVAC system components based on detecting usage of components of the HVAC system. The module 437 can communicate energy monitoring information and the state of the HVAC system components to the thermostat 434 through a communication link 436 and can control the one or more components of the HVAC system based on commands received from the thermostat 434.

In some examples, the system 400 further includes one or more robotic devices 490. The robotic devices 490 may be any type of robots that are capable of moving and taking actions that assist in security monitoring. For example, the robotic devices 490 may include the motorized furniture (as described above with respect to FIGS. 1A-3) or drones that are capable of moving throughout a property based on automated control technology and/or user input control provided by a user. In this example, the drones may be able to fly, roll, walk, or otherwise move about the property. The drones may include helicopter type devices (e.g., quad copters), rolling helicopter type devices (e.g., roller copter devices that can fly and also roll along the ground, walls, or ceiling) and land vehicle type devices (e.g., automated cars that drive around a property). In some cases, the robotic devices 490 may be robotic devices 490 that are intended for other purposes and merely associated with the system 400 for use in appropriate circumstances. For instance, a robotic vacuum cleaner device may be associated with the monitoring system 400 as one of the robotic devices 490 and may be controlled to take action responsive to monitoring system events.

In some examples, the robotic devices 490 automatically navigate within a property. In these examples, the robotic devices 490 include sensors and control processors that guide movement of the robotic devices 490 within the property. For instance, the robotic devices 490 may navigate within the property using one or more cameras, one or more proximity sensors, one or more gyroscopes, one or more accelerometers, one or more magnetometers, a global positioning system (GPS) unit, an altimeter, one or more sonar or laser sensors, and/or any other types of sensors that aid in navigation about a space. The robotic devices 490 may include control processors that process output from the various sensors and control the robotic devices 490 to move along a path that reaches the desired destination and avoids obstacles. In this regard, the control processors detect walls or other obstacles in the property and guide movement of the robotic devices 490 in a manner that avoids the walls and other obstacles.

In addition, the robotic devices 490 may store data that describes attributes of the property. For instance, the robotic devices 490 may store a floorplan and/or a three-dimensional model of the property that enables the robotic devices 490 to navigate the property. During initial configuration, the robotic devices 490 may receive the data describing attributes of the property, determine a frame of reference to the data (e.g., a home or reference location in the property), and navigate the property based on the frame of reference and the data describing attributes of the property. Further, initial configuration of the robotic devices 490 also may include learning of one or more navigation patterns in which a user provides input to control the robotic devices 490 to perform a specific navigation action (e.g., fly to an upstairs bedroom and spin around while capturing video and then return to a home charging base). In this regard, the robotic devices 490 may learn and store the navigation patterns such that the robotic devices 490 may automatically repeat the specific navigation actions upon a later request.

In some examples, the robotic devices 490 may include data capture and recording devices. In these examples, the robotic devices 490 may include one or more cameras, one or more motion sensors, one or more microphones, one or more biometric data collection tools, one or more temperature sensors, one or more humidity sensors, one or more air flow sensors, and/or any other types of sensors that may be useful in capturing monitoring data related to the property and users in the property. The one or more biometric data collection tools may be configured to collect biometric samples of a person in the home with or without contact of the person. For instance, the biometric data collection tools may include a fingerprint scanner, a hair sample collection tool, a skin cell collection tool, and/or any other tool that allows the robotic devices 490 to take and store a biometric sample that can be used to identify the person (e.g., a biometric sample with DNA that can be used for DNA testing).

In some implementations, the robotic devices 490 may include output devices. In these implementations, the robotic devices 490 may include one or more displays, one or more speakers, and/or any type of output devices that allow the robotic devices 490 to communicate information to a nearby user.

The robotic devices 490 also may include a communication module that enables the robotic devices 490 to communicate with the control unit 410, each other, and/or other devices. The communication module may be a wireless communication module that allows the robotic devices 490 to communicate wirelessly. For instance, the communication module may be a Wi-Fi module that enables the robotic devices 490 to communicate over a local wireless network at the property. The communication module further may be a 900 MHz wireless communication module that enables the robotic devices 490 to communicate directly with the control unit 410. Other types of short-range wireless communication protocols, such as Bluetooth, Bluetooth LE, Z-wave, Zig-Bee, etc., may be used to allow the robotic devices 490 to communicate with other devices in the property.

The robotic devices 490 further may include processor and storage capabilities. The robotic devices 490 may include any suitable processing devices that enable the robotic devices 490 to operate applications and perform the actions described throughout this disclosure. In addition, the robotic devices 490 may include solid state electronic storage that enables the robotic devices 490 to store applications, configuration data, collected sensor data, and/or any other type of information available to the robotic devices 490.

The robotic devices 490 are associated with one or more charging stations. The charging stations may be located at predefined home base or reference locations in the property. The robotic devices 490 may be configured to navigate to the charging stations after completion of tasks needed to be performed for the monitoring system 400. For instance, after completion of a monitoring operation or upon instruction by the control unit 410, the robotic devices 490 may be configured to automatically fly to and land on one of the charging stations. In this regard, the robotic devices 490 may automatically maintain a fully charged battery in a state in which the robotic devices 490 are ready for use by the monitoring system 400.

The charging stations may be contact based charging stations and/or wireless charging stations. For contact based charging stations, the robotic devices 490 may have readily accessible points of contact that the robotic devices 490 are capable of positioning and mating with a corresponding contact on the charging station. For instance, a helicopter type robotic device may have an electronic contact on a portion of its landing gear that rests on and mates with an electronic pad of a charging station when the helicopter type robotic device lands on the charging station. The electronic contact on the robotic device may include a cover that opens to expose the electronic contact when the robotic device is charging and closes to cover and insulate the electronic contact when the robotic device is in operation.

For wireless charging stations, the robotic devices 490 may charge through a wireless exchange of power. In these cases, the robotic devices 490 need only locate themselves closely enough to the wireless charging stations for the wireless exchange of power to occur. In this regard, the positioning needed to land at a predefined home base or reference location in the property may be less precise than with a contact based charging station. Based on the robotic devices 490 landing at a wireless charging station, the wireless charging station outputs a wireless signal that the robotic devices 490 receive and convert to a power signal that charges a battery maintained on the robotic devices 490.

In some implementations, each of the robotic devices 490 has a corresponding and assigned charging station such that the number of robotic devices 490 equals the number of charging stations. In these implementations, the robotic devices 490 always navigate to the specific charging station assigned to that robotic device. For instance, a first robotic device may always use a first charging station and a second robotic device may always use a second charging station.

In some examples, the robotic devices 490 may share charging stations. For instance, the robotic devices 490 may use one or more community charging stations that are capable of charging multiple robotic devices 490. The community charging station may be configured to charge multiple robotic devices 490 in parallel. The community charging station may be configured to charge multiple robotic devices 490 in serial such that the multiple robotic devices 490 take turns charging and, when fully charged, return to a predefined home base or reference location in the property that is not associated with a charger. The number of community charging stations may be less than the number of robotic devices 490.

Also, the charging stations may not be assigned to specific robotic devices 490 and may be capable of charging any of the robotic devices 490. In this regard, the robotic devices 490 may use any suitable, unoccupied charging station when not in use. For instance, when one of the robotic devices 490 has completed an operation or is in need of battery charge, the control unit 410 references a stored table of the occupancy status of each charging station and instructs the robotic device to navigate to the nearest charging station that is unoccupied.

The system 400 further includes one or more integrated security devices 480. The one or more integrated security devices may include any type of device used to provide alerts based on received sensor data. For instance, the one or more control units 410 may provide one or more alerts to the one or more integrated security input/output devices. Additionally, the one or more control units 410 may receive one or more sensor data from the sensors 420 and determine whether to provide an alert to the one or more integrated security input/output devices 480.

The sensors 420, the module 422, the camera 430, the thermostat 434, and the integrated security devices 480 communicate with the controller 412 over communication links 424, 426, 428, 432, 484, and 436. The communication links 424, 426, 428, 432, 484, and 436 may be a wired or wireless data pathway configured to transmit signals from the sensors 420, the module 422, the camera 430, the thermostat 434, and the integrated security devices 480 to the controller 412. The sensors 420, the module 422, the camera 430, the thermostat 434, and the integrated security devices 480 may continuously transmit sensed values to the controller 412, periodically transmit sensed values to the controller 412, or transmit sensed values to the controller 412 in response to a change in a sensed value.

The communication links 424, 426, 428, 432, 484, and 436 may include a local network. The sensors 420, the module 422, the camera 430, the thermostat 434, and the integrated security devices 480, and the controller 412 may exchange data and commands over the local network. The local network may include 802.11 "Wi-Fi" wireless Ethernet (e.g., using low-power Wi-Fi chipsets), Z-Wave, ZigBee, Bluetooth, "Homeplug" or other "Powerline" networks that operate over AC wiring, and a Category 5 (CAT5) or Category 5 (CAT6) wired Ethernet network. The local network may be a mesh network constructed based on the devices connected to the mesh network.

The monitoring server 460 is an electronic device configured to provide monitoring services by exchanging electronic communications with the control unit 410, the one or more user devices 440 and 450, and the central alarm station server 470 over the network 405. For example, the monitoring server 460 may be configured to monitor events (e.g., alarm events) generated by the control unit 410. In this example, the monitoring server 460 may exchange electronic communications with the network module 414 included in the control unit 410 to receive information regarding events (e.g., alerts) detected by the control unit 410. The monitoring server 460 also may receive information regarding events (e.g., alerts) from the one or more user devices 440 and 450.

In some examples, the monitoring server 460 may route alert data received from the network module 414 or the one or more user devices 440 and 450 to the central alarm station server 470. For example, the monitoring server 460 may transmit the alert data to the central alarm station server 470 over the network 405.

The monitoring server 460 may store sensor and image data received from the monitoring system and perform analysis of sensor and image data received from the monitoring system. Based on the analysis, the monitoring server 460 may communicate with and control aspects of the control unit 410 or the one or more user devices 440 and 450.

The central alarm station server 470 is an electronic device configured to provide alarm monitoring service by exchanging communications with the control unit 410, the one or more mobile devices 440 and 450, and the monitoring server 460 over the network 405. For example, the central alarm station server 470 may be configured to monitor alerting events generated by the control unit 410. In this example, the central alarm station server 470 may exchange communications with the network module 414 included in the control unit 410 to receive information regarding alerting events detected by the control unit 410. The central alarm station server 470 also may receive information regarding alerting events from the one or more mobile devices 440 and 450 and/or the monitoring server 460.

The central alarm station server 470 is connected to multiple terminals 472 and 474. The terminals 472 and 474 may be used by operators to process alerting events. For example, the central alarm station server 470 may route alerting data to the terminals 472 and 474 to enable an operator to process the alerting data. The terminals 472 and 474 may include general-purpose computers (e.g., desktop personal computers, workstations, or laptop computers) that are configured to receive alerting data from a server in the central alarm station server 470 and render a display of information based on the alerting data. For instance, the controller 412 may control the network module 414 to transmit, to the central alarm station server 470, alerting data indicating that a sensor 420 detected motion from a motion sensor via the sensors 420. The central alarm station server 470 may receive the alerting data and route the alerting data to the terminal 472 for processing by an operator associated with the terminal 472. The terminal 472 may render a display to the operator that includes information associated with the alerting event (e.g., the lock sensor data, the motion sensor data, the contact sensor data, etc.) and the operator may handle the alerting event based on the displayed information.

In some implementations, the terminals 472 and 474 may be mobile devices or devices designed for a specific function. Although FIG. 5 illustrates two terminals for brevity, actual implementations may include more (and, perhaps, many more) terminals.

The one or more user devices 440 and 450 are devices that host and display user interfaces. For instance, the user device 440 is a mobile device that hosts one or more native applications (e.g., the smart home application 442). The user device 440 may be a cellular phone or a non-cellular locally networked device with a display. The user device 440 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 440 may perform functions unrelated to the monitoring system, such as placing personal telephone calls, playing music, playing video, displaying pictures, browsing the Internet, maintaining an electronic calendar, etc.

The user device 440 includes a smart home application 442. The smart home application 442 refers to a software/firmware program running on the corresponding mobile device that enables the user interface and features described throughout. The user device 440 may load or install the smart home application 442 based on data received over a network or data received from local media. The smart home application 442 runs on mobile devices platforms, such as iPhone, iPod touch, Blackberry, Google Android, Windows Mobile, etc. The smart home application 442 enables the user device 440 to receive and process image and sensor data from the monitoring system.

The user device 450 may be a general-purpose computer (e.g., a desktop personal computer, a workstation, or a laptop computer) that is configured to communicate with the monitoring server 460 and/or the control unit 410 over the network 405. The user device 450 may be configured to display a smart home user interface 452 that is generated by the user device 450 or generated by the monitoring server 460. For example, the user device 450 may be configured to display a user interface (e.g., a web page) provided by the monitoring server 460 that enables a user to perceive images captured by the camera 430 and/or reports related to the monitoring system. Although FIG. 5 illustrates two user devices for brevity, actual implementations may include more (and, perhaps, many more) or fewer user devices.

In some implementations, the one or more user devices 440 and 450 communicate with and receive monitoring system data from the control unit 410 using the communication link 438. For instance, the one or more user devices 440 and 450 may communicate with the control unit 410 using various local wireless protocols such as Wi-Fi, Bluetooth, Z-wave, ZigBee, HomePlug (Ethernet over power line), or wired protocols such as Ethernet and USB, to connect the one or more user devices 440 and 450 to local security and automation equipment. The one or more user devices 440 and 450 may connect locally to the monitoring system and its sensors and other devices. The local connection may improve the speed of status and control communications because communicating through the network 405 with a remote server (e.g., the monitoring server 460) may be significantly slower.

Although the one or more user devices 440 and 450 are shown as communicating with the control unit 410, the one or more user devices 440 and 450 may communicate directly with the sensors and other devices controlled by the control unit 410. In some implementations, the one or more user devices 440 and 450 replace the control unit 410 and perform the functions of the control unit 410 for local monitoring and long range/offsite communication.

In other implementations, the one or more user devices 440 and 450 receive monitoring system data captured by the control unit 410 through the network 405. The one or more user devices 440, 450 may receive the data from the control unit 410 through the network 405 or the monitoring server 460 may relay data received from the control unit 410 to the one or more user devices 440 and 450 through the network 405. In this regard, the monitoring server 460 may facilitate communication between the one or more user devices 440 and 450 and the monitoring system.

In some implementations, the one or more user devices 440 and 450 may be configured to switch whether the one or more user devices 440 and 450 communicate with the control unit 410 directly (e.g., through link 438) or through the monitoring server 460 (e.g., through network 405) based on a location of the one or more user devices 440 and 450. For instance, when the one or more user devices 440 and 450 are located close to the control unit 410 and in range to communicate directly with the control unit 410, the one or more user devices 440 and 450 use direct communication. When the one or more user devices 440 and 450 are located far from the control unit 410 and not in range to communicate directly with the control unit 410, the one or more user devices 440 and 450 use communication through the monitoring server 460.

Although the one or more user devices 440 and 450 are shown as being connected to the network 405, in some implementations, the one or more user devices 440 and 450 are not connected to the network 405. In these implementations, the one or more user devices 440 and 450 communicate directly with one or more of the monitoring system components and no network (e.g., Internet) connection or reliance on remote servers is needed.

In some implementations, the one or more user devices 440 and 450 are used in conjunction with only local sensors and/or local devices in a house. In these implementations, the system 400 only includes the one or more user devices 440 and 450, the sensors 420, the module 422, the camera 430, and the robotic devices 490. The one or more user devices 440 and 450 receive data directly from the sensors 420, the module 422, the camera 430, and the robotic devices 490 and sends data directly to the sensors 420, the module 422, the camera 430, and the robotic devices 490. The one or more user devices 440, 450 provide the appropriate interfaces/processing to provide visual surveillance and reporting.

In other implementations, the system 400 further includes network 405 and the sensors 420, the module 422, the camera 430, the thermostat 434, and the robotic devices 490 are configured to communicate sensor and image data to the one or more user devices 440 and 450 over network 405 (e.g., the Internet, cellular network, etc.). In yet another implementation, the sensors 420, the module 422, the camera 430, the thermostat 434, and the robotic devices 490 (or a component, such as a bridge/router) are intelligent enough to change the communication pathway from a direct local pathway when the one or more user devices 440 and 450 are in close physical proximity to the sensors 420, the module 422, the camera 430, the thermostat 434, and the robotic devices 490 to a pathway over network 405 when the one or more user devices 440 and 450 are farther from the sensors 420, the module 422, the camera 430, the thermostat 434, and the robotic devices 490. In some examples, the system leverages GPS information from the one or more user devices 440 and 450 to determine whether the one or more user devices 440 and 450 are close enough to the sensors 420, the module 422, the camera 430, the thermostat 434, and the robotic devices 490 to use the direct local pathway or whether the one or more user devices 440 and 450 are far enough from the sensors 420, the module 422, the camera 430, the thermostat 434, and the robotic devices 490 that the pathway over network 405 is required. In other examples, the system leverages status communications (e.g., pinging) between the one or more user devices 440 and 450 and the sensors 420, the module 422, the camera 430, the thermostat 434, and the robotic devices 490 to determine whether communication using the direct local pathway is possible. If communication using the direct local pathway is possible, the one or more user devices 440 and 450 communicate with the sensors 420, the module 422, the camera 430, the thermostat 434, and the robotic devices 490 using the direct local pathway. If communication using the direct local pathway is not possible, the one or more user devices 440 and 450 communicate with the sensors 420, the module 422, the camera 430, the thermostat 434, and the robotic devices 490 using the pathway over network 405.

In some implementations, the system 400 provides end users with access to images captured by the camera 430 to aid in decision making. The system 400 may transmit the images captured by the camera 430 over a wireless WAN network to the user devices 440 and 450. Because transmission over a wireless WAN network may be relatively expensive, the system 400 uses several techniques to reduce costs while providing access to significant levels of useful visual information.

In some implementations, a state of the monitoring system and other events sensed by the monitoring system may be used to enable/disable video/image recording devices (e.g., the camera 430). In these implementations, the camera 430 may be set to capture images on a periodic basis when the alarm system is armed in an "Away" state, but set not to capture images when the alarm system is armed in a "Stay" state or disarmed. In addition, the camera 430 may be triggered to begin capturing images when the alarm system detects an event, such as an alarm event, a door-opening event for a door that leads to an area within a field of view of the camera 430, or motion in the area within the field of view of the camera 430. In other implementations, the camera 430 may capture images continuously, but the captured images may be stored or transmitted over a network when needed.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A method performed by one or more computers, the method comprising:
   receiving, from a sensor located at a property, sensor data;
   based on the sensor data, determining an event that is occurring at the property;
   based on the event that is occurring at the property, determining a configuration for furniture located at the property; and
   providing, to the furniture, instructions to move into the configuration.

2. The method of claim 1, wherein determining the configuration for the furniture located at the property comprises determining a position for the furniture such that at least one of the following is provided:
   the furniture is to be moved to a position that provides one or more persons in the property a clear path to one or more exits of the property;
   the furniture is to be moved adjacent to one or more walls of the property;
   the furniture is to be moved away from a door of the property; or
   the furniture is to be moved away from a window of the property.

3. The method of claim 2, wherein determining the event that is occurring at the property comprises determining that an emergency is occurring at the property.

4. The method of claim 1, wherein determining the configuration for the furniture located at the property comprises determining a position for the furniture such that at least one of the following is provided:
   the furniture is to be moved in front of a window of the property; or
   the furniture is to be moved in front of a door of the property.

5. The method of claim 4, wherein determining the event that is occurring at the property comprises:
   determining that a break-in is occurring at the property; or
   determining that an area in which the property is located is experiencing severe weather.

6. The method of claim 1, wherein determining the configuration for the furniture located at the property comprises determining a position for the furniture such that at least one of the following is provided:
   the furniture is to be moved away from one or more animals in the property;
   the furniture is to be moved away from a pool outside the property;
   the furniture is to be moved away from an open or broken window of the property;
   the furniture is to be moved away from an open door of the property;
   the furniture is to be moved away from a fire in the property;
   the furniture is to be moved away from a heating element of the property;

the furniture is to be moved away from a cooling element of the property;

the furniture is to be moved away from direct sunlight;

the furniture is to be moved away from moisture; or the furniture is to be moved to place at least a portion of the furniture on which an asset rests away from one or more of direct sunlight, moisture, fire, smoke, or a heating element of the property.

7. The method of claim 6, wherein determining the event that is occurring at the property comprises:

determining that the furniture is being damaged;

determining that a likelihood of the furniture being damaged meets a threshold likelihood;

determining that an asset placed on the furniture is being damaged; or determining that a likelihood of an asset placed on the furniture being damaged meets a threshold likelihood.

8. The method of claim 1, wherein determining the configuration for the furniture located at the property comprises determining a position for the furniture such that at least one of the following is provided:

the furniture is to be moved to a position away from a heating element of the property;

the furniture is to be moved to a position away from a cooling element of the property;

the furniture is to be moved to a position in front of a window of the property that is allowing sunlight to enter the property;

the furniture is to be moved to a position away from a window of the property to allow additional sunlight to enter the property;

the furniture is to be moved to a position in front of a window of the property that is open or broken; or the furniture is to be moved to a position away from a window of the property that is open or broken.

9. The method of claim 8, wherein determining the event that is occurring at the property comprises:

determining that a temperature of the property meets a threshold temperature;

determining that a rate of temperature increase meets a threshold rate;

determining that a rate of temperature decrease meets a threshold rate;

determining that a heating unit of the property has been turned on;

determining that a cooling unit of the property has been turned on;

determining that a heating unit of the property has been turned off; or determining that a cooling unit of the property has been turned off.

10. The method of claim 9, wherein determining the configuration for the furniture located at the property comprises determining a position for the furniture such that at least one of the following is provided:

the furniture is to be moved to a position adjacent to a person in the property; or the furniture is to be moved to a position closer to a pool of the property.

11. The method of claim 10, wherein determining the event that is occurring at the property comprises determining that one or more persons at the property require assistance.

12. The method of claim 1, wherein determining the configuration for the furniture located at the property comprises determining a position for the furniture such that at least one of the following is provided:

the furniture is to be moved to a position away from one or more persons in the property; or the furniture is to be moved adjacent to one or more walls of the property.

13. The method of claim 12, wherein determining the event that is occurring at the property comprises determining that an occupancy of the property exceeds a threshold occupancy.

14. The method of claim 1, wherein determining the configuration for the furniture located at the property comprises:

determining a current position of the furniture; and determining a final position for the furniture.

15. The method of claim 14, wherein determining the configuration for the furniture located at the property comprises determining a path for the furniture to travel from the current position to the final position.

16. The method of claim 1, wherein:

determining the event that is occurring at the property comprises:

determining that a break-in is occurring at the property;

determining that an area in which the property is located is experiencing severe weather; or determining that a current time corresponds to a scheduled arrival time of a visitor at the property, and determining the configuration for the furniture located at the property comprises:

determining to close one or more motorized components of the furniture; or determining to lock one or more locking mechanisms of the furniture.

17. The method of claim 1, wherein:

determining that event that is occurring at the property comprises:

determining an emergency is occurring at the property;

determining an occupancy of the property has met a threshold occupancy;

determining a current time is within a time period;

determining the furniture or an asset placed on the furniture is in direct sunlight; or determining the furniture or an asset placed on the furniture is adjacent an open or broken window, and determining the configuration for the furniture located at the property comprises determining to raise the furniture.

18. The method of claim 1, wherein:

determining that event that is occurring at the property comprises:

determining an occupancy of the property has met a threshold occupancy;

determining a current time is within a time period;

determining one or more persons at the property need assistance;

determining a break-in is occurring at the property; or determining an emergency is occurring at the property, and determining the configuration for the furniture located at the property comprises determining to extend or compress the furniture.

19. A system comprising:

one or more computers; and one or more computer-readable media storing instructions that, when executed, cause the one or more computers to perform operations comprising:

receiving, from a sensor located at a property, sensor data;

based on the sensor data, determining an event that is occurring at the property;

based on the event that is occurring at the property, determining a configuration for furniture located at the property; and providing, to the furniture, instructions to move into the configuration.

20. One or more non-transitory computer-readable media storing instructions that, when executed by one or more computers, cause the one or more computers to perform operations comprising:

receiving, from a sensor located at a property, sensor data;

based on the sensor data, determining an event that is occurring at the property;

based on the event that is occurring at the property, determining a configuration for furniture located at the property; and providing, to the furniture, instructions to move into the configuration.

* * * * *